United States Patent
Zhou et al.

(10) Patent No.: US 10,735,740 B2
(45) Date of Patent: Aug. 4, 2020

(54) BIT RATE CONTROL METHOD AND DEVICE

(71) Applicant: HANGZHOU HIKVISION DIGITAL TECHNOLOGY CO., LTD., Hangzhou (CN)

(72) Inventors: Lulu Zhou, Hangzhou (CN); Jianhua Chen, Hangzhou (CN); Xiaoyang Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/472,101

(22) PCT Filed: May 31, 2017

(86) PCT No.: PCT/CN2017/086568
§ 371 (c)(1),
(2) Date: Jun. 20, 2019

(87) PCT Pub. No.: WO2018/113191
PCT Pub. Date: Jun. 28, 2018

(65) Prior Publication Data
US 2020/0128253 A1 Apr. 23, 2020

(30) Foreign Application Priority Data
Dec. 21, 2016 (CN) .......................... 2016 1 1192507

(51) Int. Cl.
*H04N 19/146* (2014.01)
*H04N 19/166* (2014.01)
(Continued)

(52) U.S. Cl.
CPC ......... *H04N 19/152* (2014.11); *H04N 19/166* (2014.11); *H04N 19/37* (2014.11)

(58) Field of Classification Search
CPC ..... H04N 19/152; H04N 19/37; H04N 19/166
(Continued)

(56) References Cited

U.S. PATENT DOCUMENTS

| | | | |
|---|---|---|---|
| 5,623,424 A | * | 4/1997 | Azadegan ............ G11B 27/031 375/E7.088 |
| 7,856,149 B2 | * | 12/2010 | Govindaswamy .......................... H04N 7/17318 382/232 |

(Continued)

FOREIGN PATENT DOCUMENTS

| | | |
|---|---|---|
| CN | 106060548 | 10/1916 |
| CN | 106231320 | 12/1916 |

(Continued)

OTHER PUBLICATIONS

Extended European Search Report issued in corresponding European Application No. 17884537.6, dated Nov. 22, 2019.
(Continued)

*Primary Examiner* — Susan E. Hodges
(74) *Attorney, Agent, or Firm* — Norton Rose Fulbright US LLP

(57) ABSTRACT

A bit rate control method device obtains a bit rate control mode and coding control parameters of a current short period in a long period, determines a frame-level coding parameter of the current short period, and transmits the frame-level coding parameter to an encoder. Second bit stream information is obtained and statistical analysis is performed which includes complexity information of the current video frame, the number of the encoded bits in the current short period, and coding quality information of the current short period, so as to encode a video frame of the next, adjacent short period by calculating a frame-level coding parameter of the next, adjacent short period. By the (Continued)

present solution, the storage space is allocated reasonably under the condition that the image satisfies a certain quality.

13 Claims, 9 Drawing Sheets

(51) Int. Cl.
    *H04N 7/12*     (2006.01)
    *H04N 19/152*     (2014.01)
    *H04N 19/37*     (2014.01)

(58) Field of Classification Search
    USPC ......................................................... 375/240
    See application file for complete search history.

(56) References Cited

U.S. PATENT DOCUMENTS 8,913,658 B2 * 12/2014 Tripathi ............... H04N 19/149
                                              375/240.03
2003/0152151 A1     8/2003   Hsieh et al.

FOREIGN PATENT DOCUMENTS

| CN | 101202912 | 6/2008 |
|---|---|---|
| CN | 104159109 | 11/2014 |
| CN | 104469367 | 3/2015 |
| WO | WO 0180570 | 10/2001 |
| WO | WO 2008042259 | 4/2008 |

OTHER PUBLICATIONS

Minhua Zhou, "Digital Video Broadcasting with Improved Picture Quality; Optimization of MPEG-2 Video Coding", Chapter 4, Chapter 5 and Chapter 11, Aug. 1, 1997, Dissertation, Shaker Verlag, ISBN 978-3-8265-2817-0, Berlin, Germany, pp. 41-70, 149-162.

International Search Report and Written Opinion issued in Corresponding International Patent Application No. PCT/CN2017/086568, dated Sep. 15, 2017.

* cited by examiner

BIT RATE CONTROL METHOD AND DEVICE

CROSS-REFERENCE TO RELATED APPLICATIONS

The present application is a national phase under 35 U.S.C. § 371 of International Application No. PCT/CN2017/086568, filed May 31, 2017, which claims priority to Chinese patent application No. 201611192507.7 filed with the China National Intellectual Property Administration on Dec. 21, 2016 and entitled "Bit Rate Control Method and Device", each of which are incorporated herein by reference in their entirety.

TECHNICAL FIELD

The present application relates to the technical field of video encoding, and in particular, to a bit rate control method and device.

BACKGROUND

In processes of video transmission or storage, in order to reduce the amount of data to be transmitted or stored, it is usually required to compress and encode the original video data. The motion complexity, dynamic texture, masking, illumination variation or the like would be different per frame, and thus the amount of data of the compressed frame will change, and the bit rate of video transmission in unit time will fluctuate. In an actual video transmission or storage application, due to limitations on the bandwidth and storage space, it is often required to limit the maximum, average, and the like of the bit rate. The process of controlling bit rate is a process of controlling some coding parameters of an encoder such that the bit rate generated by the encoder is as expected. The relationship between the bit rate controller and the encoder is as shown in FIG. 1. An encoder 103 encodes an input video frame 101 based on the coding parameters output by a bit rate controller 102, feeds back the status of the encoded bit stream to the bit rate controller 102, and outputs a video bit stream.

In practical applications, there are usually two bit rate control modes: VBR (Variable Bit Rate) and CBR (Constant Bit Rate). The VBR sets the image quality value and the upper limit of the bit rate, and stably maintains the image quality at the set value without exceeding the upper limit of the bit rate. This mode is suitable for application scenarios of local storage. The CBR maintains the instantaneous output bit rate at a set bit rate value, which is suitable for application scenarios where the channel bandwidth is substantially constant.

When a coding device adopts the VBR mode, since it is difficult to estimate the fluctuation of the bit rate, the upper limit of the bit rate of the VBR is generally used to calculate the storage space, which may result in a large estimated capacity of the storage device and thus wasting storage resources. When a coding device adopts the CBR mode, the target bit rate value of the CBR can be used to accurately estimate the storage space required by a monitoring system. However, the CBR algorithm performs encoding in both of a simple scenarios and a complex scenarios by using a same target bit rate; when encoding in a complex scenarios, in order to prevent overflow of storage space, a greater bit rate cannot be used for encoding, which results in a degradation in image quality. Therefore, it is difficult to obtain a bit stream with the best definition and effect through the above two commonly used bit rate control modes with the maximum efficiency in a certain capacity of the storage space.

For the problem that the estimated capacity of the storage apparatus is too large and the storage resources are wasted in the VBR mode, in the prior art, it is proposed to configure a smaller storage space for the coding device according to service requirements, monitor the remaining storage space and storage time in real time on the basis of obtaining a fixed-quality video encoded bit stream using the VBR, and ensure that the actual encoding bit stream meets the storage space requirements by using a bit rate controlling strategy such as frameskip, lowing quantization parameters or the like. However, this solution can only ensure that the actual encoding size is not greater than a preset storage space, which may cause excessive space remaining on the hard disk during actual use.

For the problem of unstable image quality in CBR mode, in the prior art, a buffer adaptive bit stream control method is proposed. This method is to adjust, based on the CBR, the two parameters of the target equilibrium point of the virtual buffer and the buffer adjustment strength through the analysis of the image complexity information over a period of time to cope with the frameskip and unstable image quality due to the image becoming complex. However, in this solution, the adjustment margin of the target balance point is too small, which can only cope with a short-term image complexity. If the scene becomes complicated for a long time, it is difficult to ensure that the bit rate during an idle period can be distributed to the busy period, thereby resulting in that there is not enough storage space to guarantee image quality during the busy period.

In summary, the bit rate control methods in the prior art cannot allocate storage space reasonably under the condition that the image satisfies a certain quality.

SUMMARY

The present application provides a bit rate control method and device, which realizes reasonable allocation of storage space under the condition that the image satisfies a certain quality. The specific technical solutions are as follows.

In a first aspect, an embodiment of the present application provides a bit rate control method, including:

obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period;

obtaining second bit stream information sent by the encoder, wherein the second bit stream information is information of a bit stream encoded through encoding the current video frame by the encoder according to the frame-level coding parameter of the current short period;

obtaining, according to the second bit stream information, statistical information comprising complexity information of the current video frame, the number of the encoded bits of the current short period, and coding quality information of the current short period;

determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

Optionally, the preset bit rate control parameters include a preset upper limit of the bit rate, a preset image quality level, a preset average bit rate, a control error of the preset average bit rate, and a preset frame rate;

the bit stream information includes coding quality information and length information of bit stream.

Optionally, before obtaining a bit rate control mode and coding control parameters of a current short period in a long period, determining a frame-level coding parameter of the current short period according to the obtained bit rate control mode and coding control parameters, the method further includes:

obtaining preset bit rate control parameters and a preset period length of the long period input by a user;

determining a target balance upper limit of the virtual buffer of the long period, a target balance lower limit of the virtual buffer of the long period, and an expected output bit rate of the virtual buffer of the long period according to the control error of the preset average bit rate, the preset average bit rate, the preset period length of the long period, a preset initial fullness, and a preset condition, wherein the preset condition is:

$$\begin{cases} 0 \leq \text{ERROR\_RANGE} \leq 1 \\ \text{MinVBF} \leq \text{InitVBF} \leq \text{MaxVBF} \\ \text{MaxVBF} - \text{MinVBF} \leq \text{ERROR\_RANGE} \% \cdot \text{TARGET\_BITRATE} \cdot T \\ (1 - \text{ERROR\_RANGE}) \cdot \text{TARGET\_BITRATE} \leq \text{target\_bitrate} \leq \\ \qquad \text{TARGET\_BITRATE} \end{cases}$$

ERROR_RANGE is the control error of the preset average bit rate, MinVBF is the target balance lower limit of the virtual buffer of the long period, InitVBF is the preset initial fullness, MaxVBF is the target balance upper limit of the virtual buffer of the long period, TARGET_BITRATE is the preset average bit rate, T is the preset period length of the long period, target_bitrate is the expected output bit rate of the virtual buffer of the long period.

Optionally, the coding control parameters further comprises an average bit rate of the current short period;

obtaining a bit rate control mode and coding control parameters of a current short period in a long period, determining a frame-level coding parameter of the current short period according to the obtained bit rate control mode and coding control parameters comprises:

when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period;

or, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period;

or, when the obtained bit rate control mode of the current short period in the long period includes both of a CBR mode and a VBR mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information; determining a second frame-level coding parameter corresponding to the VBR by calculation according to the preset upper limit of the bit rate, the preset frame rate in the preset bit rate control parameters and the first bit stream information; when the frame-level coding parameter has a positive correlation with the bit stream length, determining a minimum value in the first frame-level coding parameter and the second frame-level coding parameter as the frame-level coding parameter of the current short period; when the frame-level coding parameter has a negative correlation with the bit stream length, determining a maximum value in the first frame-level coding parameter and the second frame-level coding parameter as the frame-level coding parameter of the current short period.

Optionally, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information includes:

obtaining the average bit rate of the current short period and the preset frame rate in the preset bit rate control parameters, and obtaining a first target bit average of video frames in the current short period by calculation according to the average bit rate of the current short period and the preset frame rate in the preset bit rate control parameters;

obtaining a bit stream length in the first bit stream information and a first fullness of the virtual buffer of the current short period corresponding to the CBR, and updating the first fullness by calculation according to the bit stream length in the first bit stream information, the first fullness and the first target bit average;

obtaining a first target fullness of the virtual buffer of the current short period corresponding to the CBR, and obtaining a first target bit of the current video frame in the current short period by calculation according to the first fullness, the first target fullness, the first target bit average and a preset adjustment intensity parameter;

determining a first frame-level coding parameter of the current short period corresponding to the CBR by calculation according to the coding quality information in the first bit stream information, the bit stream length in the first bit stream information, the first target bit and the first target bit average.

Optionally, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information includes:

obtaining the preset upper limit of the bit rate and the preset frame rate in the preset bit rate control parameters, and obtaining a second target bit average of video frames in the current short period by calculation according to the preset upper limit of the bit rate and the preset frame rate in the preset bit rate control parameters;

obtaining a bit stream length in the first bit stream information, a second fullness of the virtual buffer of the current short period corresponding to the VBR, and a second target fullness of the virtual buffer of the current short period corresponding to the VBR, and determining a maximum value in the second fullness after being updated and the second target bit average as the second fullness by calculation according to the bit stream length in the first bit stream information, the second fullness and the second target bit average;

obtaining a second target bit of the current video frame in the current short period by calculation according to the second fullness, the second target fullness, the second target bit average, and the preset adjustment intensity parameter;

determining the second frame-level coding parameter of the current short period corresponding to the VBR by calculation according to the coding quality information in the first bit stream information, the bit stream length in the first bit stream information, the second target bit, and the second target bit average.

Optionally, the method further includes:
when the long period ends, performing bit rate control of the first short period in a next long period.

Optionally, the method further includes:
when the current short period has not ended, obtaining the first bit stream information.

Optionally, obtaining a period length of the current short period, the preset bit rate control parameters and the statistical information, and determining an average bit rate of a next short period adjacent to the current short period in the long period according to the period length of the current short period, the preset bit rate control parameters and the statistical information includes:

obtaining the expected output bit rate of the virtual buffer of the long period, and determining the expected output bit rate of the virtual buffer of the long period as an expected output bit rate of the current short period;

obtaining the period length of the current short period and the expected output bit rate of the current short period, and obtaining expected output bits of the current short period by calculation according to the period length of the current short period and the expected output bit rate of the current short period;

obtaining an actual fullness of the virtual buffer of the long period, and updating the actual fullness of the virtual buffer of the long period by calculation according to the expected output bits of the current short period, the number of the encoded bits in the current short period, and the actual fullness of the virtual buffer of the long period;

calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period;

calculating a weighted factor of a complexity target bit according to the actual fullness of the virtual buffer of the long period, the preset initial fullness, the target balance upper limit of the virtual buffer of the long period, and the target balance lower limit of the virtual buffer of the long period;

obtaining a target bit rate of the virtual buffer of the next short period in the long period by calculation according to the target fullness of the virtual buffer of the long period, the actual fullness of the virtual buffer of the long period, a preset adjustment intensity parameter, and a preset adjustment reference bit rate;

determining a complexity target bit rate of the next short period in the long period according to the complexity information of the current video frame, the preset image quality level, the number of the encoded bits in the current short period, and the period length of the current short period;

determining an average bit rate of the next short period in the long period by weighted calculation according to the target bit rate of the virtual buffer of the next short period in the long period, the complexity target bit rate of the next short period in the long period, and the weighted factor of a complexity target bit.

Optionally, calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period includes:

determining whether the actual fullness of the virtual buffer of the long period is between the target balance upper limit of the virtual buffer of the long period and the target balance lower limit of the virtual buffer of the long period;

if yes, determining the initial fullness as the target fullness of the virtual buffer of the long period;

if not, when the actual fullness of the virtual buffer of the long period is greater than the target balance upper limit of the virtual buffer of the long period, determining the target balance upper limit of the virtual buffer of the long period as the target fullness of the virtual buffer of the long period; when the actual fullness of the virtual buffer of the long period is less than the target balance lower limit of the virtual buffer of the long period, determining the target balance lower limit of the virtual buffer of the long period as the target fullness of the virtual buffer of the long period.

Optionally, calculating a weighted factor of a complexity target bit according to the actual fullness of the virtual buffer of the long period, the preset initial fullness, the target balance upper limit of the virtual buffer of the long period, and the target balance lower limit of the virtual buffer of the long period includes:

determining whether the actual fullness of the virtual buffer of the long period is between the target balance upper limit of the virtual buffer of the long period and the target balance lower limit of the virtual buffer of the long period;

if yes, setting the weighted factor of a complexity target bit as a preset first value;

if not, setting the weighted factor of a complexity target bit as a preset second value.

In a second aspect, an embodiment of the present application provides a bit rate control apparatus, including:

a short period control module, configured for obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period, the preset bit rate control parameters include a preset upper limit of the bit rate, a preset image quality level, a preset average bit rate, a control error of the preset average bit rate, and a preset frame rate, the bit stream information includes coding quality information and length information of bit stream; obtaining second bit stream information sent by the encoder, wherein the second bit stream information is information of a bit stream encoded through encoding the current video frame by the encoder according to the frame-level coding parameter of the current short period;

a data statistics module, configured for obtaining, according to the second bit stream information, statistical information comprising complexity information of the current video frame, the number of the encoded bits of the current short period, and coding quality information of the current short period;

a long period control module, configured for determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

Optionally, the device further includes:

a model initialization module, configured for obtaining preset bit rate control parameters and a preset period length of the long period input by a user; determining a target balance upper limit of the virtual buffer of the long period, a target balance lower limit of the virtual buffer of the long period, and an expected output bit rate of the virtual buffer of the long period according to the control error of the preset average bit rate, the preset average bit rate, the preset period length of the long period, a preset initial fullness, and a preset condition, wherein the preset condition is:

$$\begin{cases} 0 \le \text{ERROR\_RANGE} \le 1 \\ \text{Min}VBF \le \text{Init}VBF \le \text{Max}VBF \\ \text{Max}VBF - \text{Min}VBF \le \text{ERROR\_RANGE } \% \cdot \text{TARGET\_BITRATE} \cdot T \\ (1 - \text{ERROR\_RANGE}) \cdot \text{TARGET\_BITRATE} \le \text{target\_bitrate} \le \\ \qquad \text{TARGET\_BITRATE} \end{cases}$$

ERROR_RANGE is the control error of the preset average bit rate, MinVBF is the target balance lower limit of the virtual buffer of the long period, InitVBF is the preset initial fullness, MaxVBF is the target balance upper limit of the virtual buffer of the long period, TARGET_BITRATE is the preset average bit rate, T is the preset period length of the long period, target_bitrate is the expected output bit rate of the virtual buffer of the long period.

Optionally, the apparatus further includes:

a complexity analysis module, configured for performing complexity analysis on the current video frame to obtain complexity information of the current video frame.

Optionally, the coding control parameters further include an average bit rate of the current short period;

the short period control module includes:

a frame-level CBR bit rate control sub-module, configured for, when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period;

a frame-level VBR bit rate control sub-module, configured for, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period;

a frame-level bit rate control sub-module, configured for, when the obtained bit rate control mode of the current short period in the long period includes both of a CBR mode and a VBR mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information; determining a second frame-level coding parameter corresponding to the VBR by calculation according to the preset upper limit of the bit rate, the preset frame rate in the preset bit rate control parameters and the first bit stream information; when the frame-level coding parameter has a positive correlation with the bit stream length, determining a minimum value in the first frame-level coding parameter and the second frame-level coding parameter as the frame-level coding parameter of the current short period; when the frame-level coding parameter has a negative correlation with the bit stream length, determining a maximum value in the first frame-level coding parameter and the second frame-level coding parameter as the frame-level coding parameter of the current short period.

Optionally, the frame-level CBR bit rate control sub-module includes:

a first calculating unit, configured for obtaining the average bit rate of the current short period and the preset frame rate in the preset bit rate control parameters, and obtaining a first target bit average of video frames in the current short period by calculation according to the average bit rate of the current short period and the preset frame rate in the preset bit rate control parameters;

a second calculating unit, configured for obtaining a bit stream length in the first bit stream information and a first fullness of the virtual buffer of the current short period corresponding to the CBR, and updating the first fullness by calculation according to the bit stream length in the first bit stream information, the first fullness and the first target bit average;

a third calculating unit, configured for obtaining a first target fullness of the virtual buffer of the current short period corresponding to the CBR, and obtaining a first target bit of the current video frame in the current short period by calculation according to the first fullness, the first target fullness, the first target bit average and a preset adjustment intensity parameter;

a fourth calculating unit, configured for determining a first frame-level coding parameter of the current short period corresponding to the CBR by calculation according to the coding quality information in the first bit stream information, the bit stream length in the first bit stream information, the first target bit and the first target bit average.

Optionally, the frame-level VBR bit rate control sub-module includes:

a fifth calculating unit, configured for obtaining the preset upper limit of the bit rate and the preset frame rate in the preset bit rate control parameters, and obtaining a second target bit average of video frames in the current short period by calculation according to the preset upper limit of the bit rate and the preset frame rate in the preset bit rate control parameters;

a sixth calculating unit, configured for obtaining a bit stream length in the first bit stream information, a second fullness of the virtual buffer of the current short period corresponding to the VBR, and a second target fullness of the virtual buffer of the current short period corresponding to the VBR, and determining a maximum value in the second fullness after being updated and the second target bit average as the second fullness by calculation according to the bit stream length in the first bit stream information, the second fullness and the second target bit average;

a seventh calculating unit, configured for obtaining a second target bit of the current video frame in the current short period by calculation according to the second fullness, the second target fullness, the second target bit average, and the preset adjustment intensity parameter;

an eighth calculating unit, configured for determining the second frame-level coding parameter of the current short period corresponding to the VBR by calculation according to the coding quality information in the first bit stream information, the bit stream length in the first bit stream information, the second target bit, and the second target bit average.

Optionally, the apparatus is further configured for:
when the long period ends, performing bit rate control of the first short period in a next long period.

Optionally, the apparatus is further configured for:
when the current short period has not ended, obtaining the first bit stream information.

Optionally, the long period control module includes:
an expected output bit calculating sub-module, configured for obtaining the period length of the current short period and the expected output bit rate of the virtual buffer of the long period, and determining the expected output bit rate of the virtual buffer of the long period as an expected output bit rate of the current short period; obtaining expected output bits of the current short period by calculation according to the period length of the current short period and the expected output bit rate of the current short period;

a virtual buffer updating sub-module, configured for obtaining an actual fullness of the virtual buffer of the long period, and updating the actual fullness of the virtual buffer of the long period by calculation according to the expected output bits of the current short period, the number of the encoded bits in the current short period, and the actual fullness of the virtual buffer of the long period;

a buffer adaptive control sub-module, configured for calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period; and calculating a weighted factor of a complexity target bit according to the actual fullness of the virtual buffer of the long period, the preset initial fullness, the target balance upper limit of the virtual buffer of the long period, and the target balance lower limit of the virtual buffer of the long period;

a buffer target bit rate predicting sub-module, configured for obtaining a target bit rate of the virtual buffer of the next short period in the long period by calculation according to the target fullness of the virtual buffer of the long period, the actual fullness of the virtual buffer of the long period, a preset adjustment intensity parameter, and a preset adjustment reference bit rate;

a complexity target bit rate predicting sub-module, configured for determining a complexity target bit rate of the next short period in the long period according to the complexity information of the current video frame, the preset image quality level, the number of the encoded bits in the current short period, and the period length of the current short period;

an average bit rate determining sub-module, configured for determining an average bit rate of the next short period in the long period by weighted calculation according to the target bit rate of the virtual buffer of the next short period in the long period, the complexity target bit rate of the next short period in the long period, and the weighted factor of a complexity target bit.

Optionally, the buffer adaptive control sub-module is specifically further configured for:
determining whether the actual fullness of the virtual buffer of the long period is between the target balance upper limit of the virtual buffer of the long period and the target balance lower limit of the virtual buffer of the long period;
if yes, determining the initial fullness as the target fullness of the virtual buffer of the long period;
if not, when the actual fullness of the virtual buffer of the long period is greater than the target balance upper limit of the virtual buffer of the long period, determining the target balance upper limit of the virtual buffer of the long period as the target fullness of the virtual buffer of the long period;
when the actual fullness of the virtual buffer of the long period is less than the target balance lower limit of the virtual buffer of the long period, determining the target balance lower limit of the virtual buffer of the long period as the target fullness of the virtual buffer of the long period.

Optionally, the buffer adaptive control sub-module is specifically further configured for:
determining whether the actual fullness of the virtual buffer of the long period is between the target balance upper limit of the virtual buffer of the long period and the target balance lower limit of the virtual buffer of the long period;

if yes, setting the weighted factor of a complexity target bit as a preset first value;

if not, setting the weighted factor of a complexity target bit as a preset second value.

In a third aspect, an embodiment of the present application provides a storage medium for storing executable codes, wherein the executable codes are used to implement the bit rate control method according to the first aspect of the embodiments of the present application when being executed.

In a fourth aspect, an embodiment of the present application provides an application program for implementing the bit rate control method according to the first aspect of the embodiments of the present application when being executed.

In a fifth aspect, an embodiment of the present application provides a bit rate control device, including: a bit rate controller, an encoder, a memory, a communication interface, and a bus;

the bit rate controller, the encoder, the memory, and the communication interface are connected and communicate with each other via the bus;

the memory is configured to store executable program codes;

the bit rate controller is configured to execute a program corresponding to the executable program codes by reading the executable program codes stored in the memory, so as to implement the bit rate control method according to the first aspect of the embodiments of the present application;

the encoder is configured to encode a current video frame according to a frame-level coding parameter of the current short period sent by the bit rate controller so as to obtain second bit stream information and send the second bit stream information to the bit rate controller.

It can be seen from the foregoing technical solutions that the bit rate control method and apparatus according to the embodiments of the present application not only calculate the storage space accurately, but also cope with the bandwidth limitation by setting the bit rate control parameters, accurately control the error between the actual encoded average bit rate and the set average bit rate by quantization of index, utilize the configured storage space to a full extent, ensure a stable image quality by the complexity information, and realize a stable image quality during both idle period and busy period by a bit rate control method with the combination of a long period and a short period, thereby storage space is reasonably allocated under the condition that the image satisfies a certain quality.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings in the following description are only for some embodiments of the present application, other drawings may be obtained from those of ordinary skill in the art without any creative effort based on these drawings.

DETAILED DESCRIPTION OF THE INVENTION

In order to make the objects, technical solutions, and advantages of the present application more comprehensible, the present application will be further described in detail below with reference to the accompanying drawings. It is apparent that the described embodiments are only a part of the embodiments of the present application, and not all of them. All other embodiments obtained by a person of ordinary skill in the art based on the embodiments of the present application without any creative effort fall within the protection scope of the present application.

In order to make full use of the configured storage space, and to ensure that the image quality of the busy period and the idle period is stable in the case of a long-term complex scenario, the embodiments of the present application provides a bit rate control method and device.

The bit rate control method provided by the embodiments of the present application is first introduced below.

It should be noted that the execution body of a bit rate control method provided by the embodiments of the present application is a bit rate controller in a video transmission/storage application system. The functional software for implementing the bit rate control method provided by the embodiments is software provided in the bit rate controller.

Figure 1:
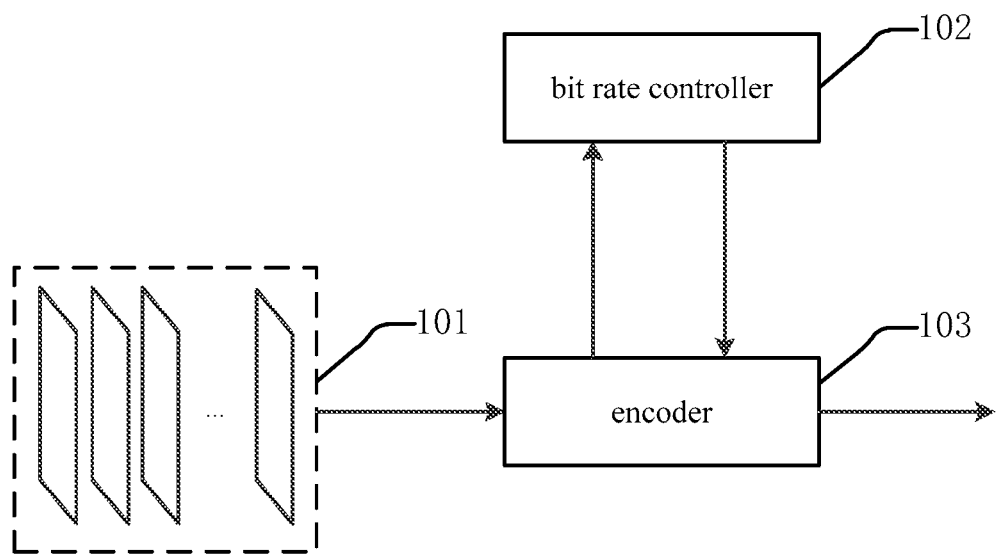
FIG. 1 is a schematic diagram of a relationship between a bit rate controller and an encoder of the related art.
Figure 2:
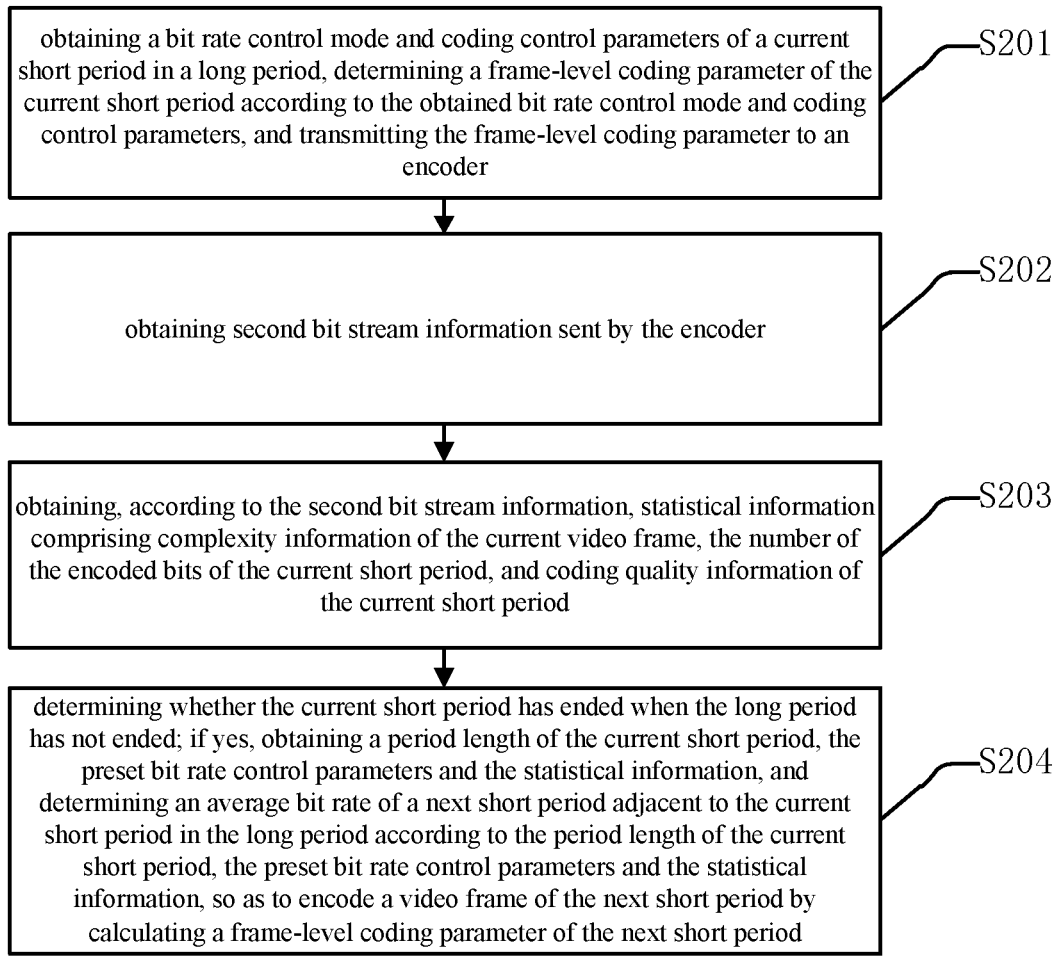
FIG. 2 is a schematic flowchart of a bit rate control method according to an embodiment of the present application.
Figure 3:
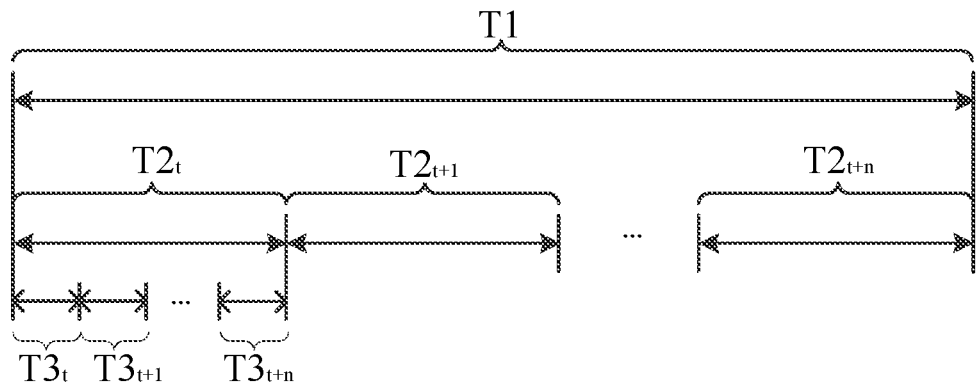
FIG. 3 is a schematic diagram of a relationship between a long period and a short period on a time scale according to an embodiment of the present application.
Figure 4:
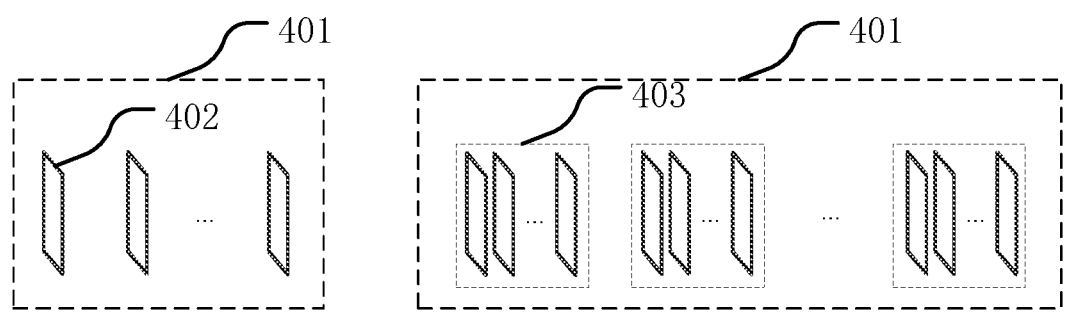
FIG. 4 is a schematic structural diagram of a short period control unit according to an embodiment of the present application.

As shown in FIG. 2, a bit rate control method provided by an embodiment of the present application may include the following steps:

S201, obtaining a bit rate control mode and coding control parameters of a current short period in a long period, determining a frame-level coding parameter of the current short period according to the obtained bit rate control mode and coding control parameters, and transmitting the frame-level coding parameter to an encoder.

Wherein the bit rate control mode includes VBR (Variable Bit Rate) and CBR (Constant Bit Rate). For the embodiment, the bit rate control mode may only be a VBR control mode, or may only be a CBR control mode, or may be a bit rate control mode that includes both VBR and CBR, which are all reasonable. The average bit rate of the current short period is the average of the bit rate that can be achieved by the target of a video frame of the current short period. The long period includes a plurality of short periods, and the current short period is any one of a plurality of short periods, the short period includes a start time and an end time, and the end time of the current short period is the same as the start time of a next, adjacent short period. The short period includes a plurality of video frames, and the current video frame is any one of the plurality of video frames. The coding control parameters at least include preset bit rate control parameters and first bit stream information, the first bit stream information is information of an encoded bit stream of a previous, adjacent video frame of the current video frame in the current short period. It should be noted that, in general, the preset average bit rate is less than the preset upper limit of the bit rate. The division of long and short periods on the time scale is shown in FIG. 3. The bit rate controller obtains a storage period T preset by a user, and sets the storage period to a period length T1 of the long period (ie, T1=T), and the long period may be divided into a plurality of short periods, and the period length of the short period is T2. The short period, acting as a long period, can be further divided into a plurality of short periods T3. In the figure, t represents the current period, then t+1 represents the next period, and sequentially t+n represents the $n^{th}$ period after the current period, wherein n is greater than 2. It should be emphasized that, as shown in FIG. 4, the short period 401 may include a plurality of video frames 402, or may include a plurality of short period GOPs (Group of Pictures) 403 that constitute the short period 401 and which are deemed shorter, which is all reasonable. Specifically, the preset bit rate control parameters may include a preset upper limit of the bit rate, a preset image quality level, a preset average bit rate, a control error of the preset average bit rate, and a preset frame rate; the bit stream information may include coding quality information and length information of bit stream; the coding quality may be represented by a coding QP (Quantization Parameter) value. It should be emphasized that the preset bit rate control parameters may be input by the user according to actual demands, or may be calculated according to the parameters in the period.

It should be noted that, in practical applications, for two different bit rate control modes of VBR and CBR, the specific implementations of the bit rate control method are specified in this embodiment, and the specific categories of the coding parameters are not specified, which may be quantization parameters, or may also be a forced frame skip flag, which is all reasonable.

S202, obtaining second bit stream information sent by the encoder.

The second bit stream information is bit stream information obtained by the encoder encoding the current video frame according to the frame-level coding parameter of the current short period.

It should be noted that the encoder encodes an input video frame according to the coding parameters, and the video coding process is a method of converting a file of a certain video format into a file of another video format through a specific compression technique. The most important codec standards in video streaming are H.261, H.263, H.264, H.265, M-JPEG of ITU, the Motion-Join Photographic Experts Group M-JPEG and the Motion Picture Experts Group MPEG standards of International Organization for Standardization. It is reasonable to use any of the above video coding technologies in this embodiment. These video coding technologies belong to the related art, and will not be further described herein.

S203, obtaining, according to the second bit stream information, statistical information comprising complexity information of the current video frame, the number of the encoded bits of the current short period, and coding quality information of the current short period.

The complexity information of the current video frame can be obtained by motion detection, or by texture complexity analysis, and can also be obtained by analyzing the size of the encoded bit stream, image quality, which are all reasonable. The complexity of a video frame can be expressed by the motion complexity or by the texture complexity; the complexity information can be represented by the motion area or the residual SAD (Sum of Absolute Difference), which is all reasonable.

It should be noted that the total coding bits of the current short period may be obtained by accumulating the length of bit stream in all the second bit stream information in the current short period, and the coding quality information of the current short period may be obtained by averaging the coding quality in all the second bit stream information in the current short period.

Optionally, in a specific implementation, a background analysis module is linked to perform background modeling and motion detection on an input video frame to be encoded before encoding and controlling the bit rate, and the motion area is counted to represent the complexity of a video frame.

It should be noted that statistical information such as the complexity information of the current video frame, the number of the encoded bits in the current short period, and the coding quality of the current short period may be stored in a memory or an RAM to be output when long period control is required.

S204, determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

Time assistance information may be used to determine whether the long period and the short period have end. The time assistance information may be time stamp information or current time. For example, when performing period configuration, the length of the long period is configured as 24 hours, and the length of the short period is configured as 10 minutes. Then, the start time of the long period is marked as 0 when the long period starts, the start time of the short period is marked as 0 when the short period starts. The execution duration during the execution is accumulated, the short period is considered to have ended after 10 minutes, the long period is considered to have ended after 24 hours. Or the initial Beijing time when the long period starts is recorded, the initial Beijing time when the short period starts is recorded, and the Beijing time of the execution instant is captured in real time during the execution, from which the initial Beijing time is subtracted. If the difference reaches 10 minutes, the short period is considered to have ended. If the difference reaches 24 hours, the long period is considered to have ended, which is all reasonable. Of course, Beijing time here can also be the time of any time zone.

It should be noted that the long period includes a short period. Whenever a short period ends, the average bit rate of a next short period needs to be determined. The next short period can only be encoded based on the frame-level coding parameter calculated by the average bit rate when the average bit rate is obtained for the next short period.

Specifically, when the long period has ended, the bit rate control of a first short period in a next long period is performed.

It should be noted that the bit rate control of the first short period in the next long period is the same as the steps of S201 to S204 described above, and details are not repeated herein.

Specifically, when the current short period has not ended, the step of obtaining the first bit stream information is performed.

It should be noted that, after the control for the current video frame is completed in the current short period, the current video frame is the previous, adjacent video frame, and the next, adjacent video frame of the current video frame is the current video frame in the current short period.

Applying the embodiment, by setting the bit rate control parameters, not only the storage space is calculated accurately but also the bandwidth limitation is coped with, the error between the actual encoded average bit rate and the set average bit rate is accurately controlled by quantization of index, the configured storage space is utilized to a full extent, a stable image quality is ensured by the complexity information, and a stable image quality is realized during both idle period and busy period by a bit rate control method with the combination of a long period and a short period, thereby storage space is reasonably allocated under the condition that the image satisfies a certain quality.

Figure 5:
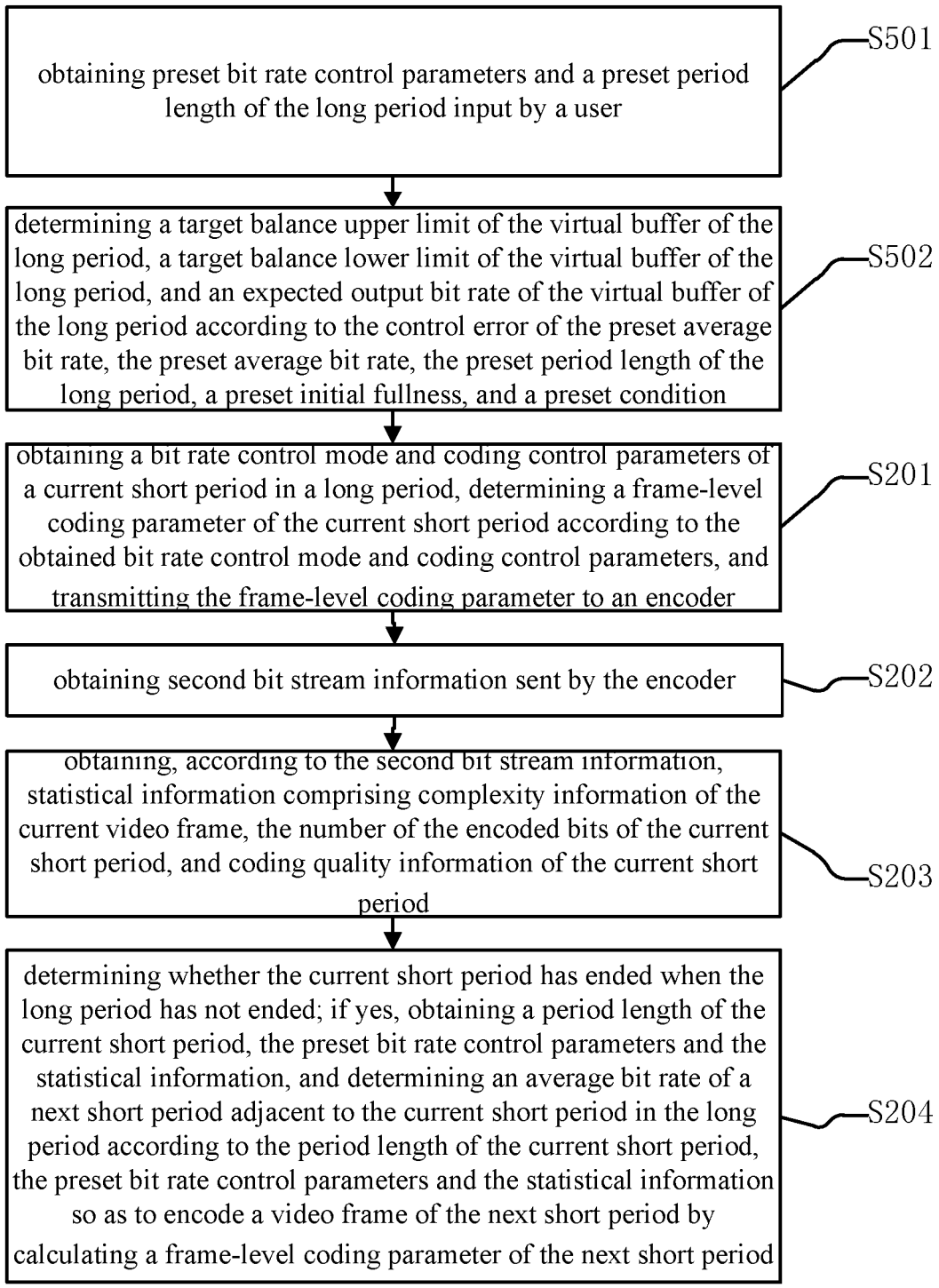
FIG. 5 is another schematic flowchart of a bit rate control method according to an embodiment of the present application.

As shown in FIG. 5, a bit rate control method provided by an embodiment of the present application may further include the following steps before obtaining a bit rate control mode and coding control parameters of a current short period in a long period and determining a frame-level coding parameter of the current short period according to the bit rate control mode and coding control parameters of the current short period in the long period:

S501, obtaining preset bit rate control parameters and a preset period length of the long period input by a user.

The preset bit rate control parameters may include a preset upper limit of the bit rate, a preset image quality level, a preset average bit rate, a control error of the preset average bit rate; the preset bit rate control parameters and the preset period length of the long period can be specified by the user according to specific needs.

S502, determining a target balance upper limit of the virtual buffer of the long period, a target balance lower limit of the virtual buffer of the long period, and an expected output bit rate of the virtual buffer of the long period according to the control error of the preset average bit rate, the preset average bit rate, the preset period length of the long period, a preset initial fullness, and a preset condition.

The preset condition is:

$$\begin{cases} 0 \le \text{ERROR\_RANGE} \le 1 \\ \text{Min}VBF \le \text{Init}VBF \le \text{Max}VBF \\ \text{Max}VBF - \text{Min}VBF \le \text{ERROR\_RANGE \%} \cdot \text{TARGET\_BITRATE} \cdot T \\ (1 - \text{ERROR\_RANGE}) \cdot \text{TARGET\_BITRATE} \le \text{target\_bitrate} \le \\ \quad\quad\quad\quad\quad\quad\quad\quad\quad\quad\quad\quad\quad\quad \text{TARGET\_BITRATE} \end{cases}$$

wherein, ERROR_RANGE is the control error of the preset average bit rate, MinVBF is the target balance lower limit of the virtual buffer of the long period, InitVBF is the preset initial fullness, MaxVBF is the target balance upper limit of the virtual buffer of the long period, TARGET_BITRATE is the preset average bit rate, T is the preset period length of the long period, target_bitrate is the expected output bit rate of the virtual buffer of the long period.

It should be noted that in order to implement control for the long period, it is necessary to create a virtual buffer, the preset initial fullness, the target balance upper limit of the virtual buffer of the long period, the target balance lower limit of the virtual buffer of the long period, and the expected output bit rate of the virtual buffer of the long period belong to the parameters of the virtual buffer. These parameters represent the size and capacity of the virtual buffer, and they have a direct relationship with the control error of the preset average bit rate and the preset average bit rate of the preset bit rate control parameters.

Optionally, in a specific implementation, the target balance upper limit of the virtual buffer of the long period, the target balance lower limit of the virtual buffer of the long period, and the expected output bit rate of the virtual buffer of the long period are determined according to Formula (1).

$$\begin{cases} \text{Init}VBF = 0 \\ \text{Max}VBF = \text{Init}VBF + \dfrac{\text{ERROR\_RANGE \%}}{2} \cdot \text{TARGET\_BITRATE} \cdot T \\ \text{Min}VBF = \text{Init}VBF - \dfrac{\text{ERROR\_RANGE \%}}{2} \cdot \text{TARGET\_BITRATE} \cdot T \\ \text{target\_bitrate} = \left(1 - \dfrac{\text{ERROR\_RANGE \%}}{2}\right) \cdot \text{TARGET\_BITRATE} \end{cases} \quad (1)$$

wherein, InitVBF is the preset initial fullness, MaxVBF is the target balance upper limit of the virtual buffer of the long period, ERROR_RANGE is the control error of the preset average bit rate, TARGET_BITRATE is the preset average bit rate, T is the preset period length of the long period, MinVBF is the target balance lower limit of the virtual buffer of the long period, target_bitrate is the expected output bit rate of the virtual buffer of the long period.

It should be noted that, initially, the initial fullness is set to 0 in advance, and it is of course possible to set the initial fullness to any other value in advance. In this embodiment, the initial fullness is assumed to be between the target balance upper limit MaxVBF of the virtual buffer of the long period and the target balance lower limit MinVBF of the virtual buffer of the long period, and the size of the control error of the preset average bit rate is equal to ½ of the difference between MaxVBF and MinVBF. Of course, if it is assumed that the size of the control error of the preset average bit rate is equal to a multiple less than 1, such as ⅓, ¼ or the like of the difference between MaxVBF and MinVBF, it is all reasonable.

It should be noted that since the bit rate control mode can be CBR, VBR, or a combination of CBR and VBR, these are all reasonable. The steps of determining a frame-level coding parameter of the current short period are different according to different bit rate control modes.

Optionally, the coding control parameters may further include an average bit rate of the current short period;

obtaining a bit rate control mode and coding control parameters of a current short period in a long period, determining a frame-level coding parameter of the current short period according to the obtained bit rate control mode and coding control parameters may include:

when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period;

or, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period;

or, when the obtained bit rate control mode of the current short period in the long period includes both of a CBR mode and a VBR mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information; determining a second frame-level coding parameter corresponding to the VBR by calculation according to the preset upper limit of the bit rate, the preset frame rate in the preset bit rate control parameters and the first bit stream information; when the frame-level coding parameter has a positive correlation with the bit stream length, determining a minimum value in the first frame-level coding parameter and the second frame-level coding parameter as the frame-level coding parameter of the current short period; when the frame-level coding parameter has a negative correlation with the bit stream length, determining a maximum value in the first frame-level coding parameter and the second frame-level coding parameter as the frame-level coding parameter of the current short period.

It should be noted that, in the bit rate control mode of the VBR, only the preset upper limit of the bit rate in the preset bit rate control parameters, the preset frame rate, and the first bit stream information are required to determine the frame-level coding parameter of the current short period, without the average bit rate of the current short period. Therefore, in this embodiment, the bit rate control mode of the first short period in the long period may be CBR, VBR, or both CBR and VBR, and the average bit rate of a next short period is calculated. For the short periods other than the first short period in the long period, the bit rate control mode can only be CBR or both CBR and VBR, not VBR.

The following takes QP as the frame-level coding parameter for example, and the steps of determining the frame-level coding parameter of the current short period are respectively introduced with respect to the above three cases of the bit rate control mode.

Optionally, in a specific implementation, when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period may include:

first, obtaining the average bit rate of the current short period and the preset frame rate in the preset bit rate control parameters, and obtaining a first target bit average of video frames in the current short period by calculation according to the average bit rate of the current short period and the preset frame rate in the preset bit rate control parameters.

It should be noted that, in this embodiment, the minimum value of the first target bit and the maximum value of the first target bit of the video frame are obtained by calculation according to the average bit rate of the current short period and the preset frame rate in the preset bit rate control parameters.

Specifically, the formula used to calculate the first target bit average of the video frame in the current short period is as shown in Formula (2), and the formula used to calculate the minimum value of the first target bit and the maximum value of the first target bit of the video frame is as shown in Formula (3), $$\text{avg\_frame\_size} = \frac{Target_t}{\text{frame\_rate}} \qquad (2)$$

$$\begin{cases} \text{MIN\_Target\_bytes}_{CBR} = \dfrac{\text{avg\_frame\_size}}{4} \\ \text{MAX\_Target\_bytes}_{CBR} = 2 \cdot \text{avg\_frame\_size} \end{cases} \qquad (3)$$

wherein, avg_frame_size is the first target bit average of the video frame in the current short period, $Target_t$ is the average bit rate of the current short period, frame_rate is the preset frame rate, MIN_Target_bytes$_{CBR}$ is the minimum value of the first target bit of the video frame, MAX_Target_bytes$_{CBR}$ is the maximum value of the first target bit of the video frame.

Second, obtaining a bit stream length in the first bit stream information and a first fullness of the virtual buffer of the current short period corresponding to the CBR, and updating the first fullness by calculation according to the bit stream length in the first bit stream information, the first fullness and the first target bit average.

Specifically, the formula used to calculate the first fullness of the virtual buffer of the current short period corresponding to the CBR is as shown in Formula (4).

$$\text{currVBF}_{CBR} = \text{currVBF}_{CBR} + (\text{recent\_bs\_lens} - \text{avg\_frame\_size}) \qquad (4)$$

wherein, currVBF$_{CBR}$ is the first fullness of the virtual buffer of the current short period corresponding to the CBR, recent_bs_lens is the bit stream length in the first bit stream information, avg_frame_size is the first target bit average of the video frame in the current short period.

Third, obtaining a first target fullness of the virtual buffer of the current short period corresponding to the CBR, and obtaining a first target bit of the current video frame in the current short period by calculation according to the first fullness, the first target fullness, the first target bit average and a preset adjustment intensity parameter.

The first target fullness of the virtual buffer of the current short period corresponding to the CBR may be set to a preset initial fullness obtained during the initialization process, and may also be set to a fullness with a fluctuating preset value with respect to the preset initial fullness obtained in the initializing process.

Specifically, the formula used to calculate the first target bit of the current video frame in the current short period is as shown in Formula (5).

$$\text{Target\_bytes}_{CBR} = \left(1 + K_p \cdot \frac{targetVBF_{CBR} - currVBF_{CBR}}{targetVBF_{CBR}}\right) \cdot \text{avg\_frame\_size} \quad (5)$$

wherein, Target_bytes$_{CBR}$ is the first target bit of the current video frame in the current short period, $K_p$ is the preset adjustment intensity parameter, target VBF$_{CBR}$ is the first target fullness of the virtual buffer of the current short period corresponding to the CBR, currVBF$_{CBR}$ is the first fullness of the virtual buffer of the current short period corresponding to the CBR, avg_frame_size is the first target bit average of the video frame in the current short period; the preset adjustment intensity parameter is a parameter for controlling the adjustment intensity of the target bit of the current video frame in the current short period, and may be set to any value between 0 to 1.0.

It should be emphasized that the first target bit has the following relationships with the minimum value of the first target bit and the maximum value of the first target bit: Target_bytes$_{CBR}$=CLIP3(Target_bytes$_{CBR}$, MIN_Target_bytes$_{CBR}$, MAX_Target_bytes$_{CBR}$) wherein, the function of CLIP3(Target_bytes$_{CBR}$, MIN_Target_bytes$_{CBR}$, MAX_Target_bytes$_{CBR}$) represents that Target_bytes$_{CBR}$ is itself when the first target bit Target_bytes$_{CBR}$ is greater than the minimum value of the first target bit MIN_Target_bytes$_{CBR}$ and less than the maximum value of the first target bit MAX_Target_bytes$_{CBR}$; when Target_bytes$_{CBR}$ is less than MIN_Target_bytes$_{CBR}$; MIN_Target_bytes$_{CBR}$ is assigned to Target_bytes$_{CBR}$; when Target_bytes$_{CBR}$ is greater than MAX_Target_bytes$_{CBR}$, MAX_Target_bytes$_{CBR}$ is assigned to Target_bytes$_{CBR}$.

Finally, determining a first frame-level coding parameter of the current short period corresponding to the CBR by calculation according to the coding quality information in the first bit stream information, the bit stream length in the first bit stream information, the first target bit and the first target bit average, and using the first frame-level coding parameter as the frame-level coding parameter of the current short period.

Specifically, the formula used to calculate the first frame-level coding parameter of the current short period corresponding to the CBR is as shown in Formula (6).

$$QP_{CBR} = \text{prev\_qp} + \frac{K_{bytes\_to\_qp} \cdot (\text{recent\_bs\_lens} - \text{Target\_bytes}_{CBR})}{\text{avg\_frame\_size}} \quad (6)$$

wherein, QP$_{CBR}$ is the first frame-level coding parameter of the current short period corresponding to the CBR, prev_qp is a value of a quantization parameter of the coding quality, $K_{bytes\_to\_qp}$ is a preset conversion parameter, recent_bs_lens is the bit stream length in the first bit stream information Target_bytes$_{CBR}$ is the first target bit of the current video frame in the current short period, avg_frame_size is the first target bit average of the video frame in the current short period; the value of the quantization parameter of the coding quality may be the value of the coding QP used by the coded bit stream length of the previous, adjacent video frame; the preset conversion parameter indicates the conversion relationship between the coding bits and the QP value; it should be emphasized that the preset conversion parameter is related to the types of the video frame, and the types of the video frame include a P frame, an I frame, and a B frame; the preset conversion parameter of the I frame is the largest and the preset conversion parameter of the B frame is the smallest.

Optionally, in a specific implementation, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period may include:

first, obtaining the preset upper limit of the bit rate and the preset frame rate in the preset bit rate control parameters, and obtaining a second target bit average of video frames in the current short period by calculation according to the preset upper limit of the bit rate and the preset frame rate in the preset bit rate control parameters.

It should be noted that, in this embodiment, the minimum value of the second target bit and the maximum value of the second target bit of the video frame are obtained by calculation according to the preset upper limit of the bit rate and the preset frame rate in the preset bit rate control parameters.

Specifically, the formula used to calculate the second target bit average of the video frame in the current short period is as shown in Formula (7), and the formula used to calculate the minimum value of the second target bit and the maximum value of the second target bit of the video frame is as shown in Formula (8), $$\text{max\_frame\_size} = \frac{\text{MAX\_BITRATE}}{\text{frame\_rate}} \quad (7)$$

$$\begin{cases} \text{MIN\_Target\_bytes}_{VBR} = \frac{\text{max\_frame\_size}}{4} \\ \text{MAX\_Target\_bytes}_{VBR} = 2 \cdot \text{max\_frame\_size} \end{cases} \quad (8)$$

wherein, max_frame_size is the second target bit average of the video frame in the current short period MAX_BITRATE is the preset upper limit of the bit rate, frame_rate is the preset frame rate, MIN_Target_bytes$_{VBR}$ is the minimum value of the second target bit of the video frame, and MAX_Target_bytes$_{VBR}$ is the maximum value of the second target bit of the video frame.

Second, obtaining a bit stream length in the first bit stream information, a second fullness of the virtual buffer of the current short period corresponding to the VBR, and a second target fullness of the virtual buffer of the current short period corresponding to the VBR, and determining a maximum value in the second fullness after being updated and the second target bit average as the second fullness by calculation according to the bit stream length in the first bit stream information, the second fullness and the second target bit average.

The first target fullness of the virtual buffer of the current short period corresponding to the VBR may be set to the preset initial fullness obtained during the initialization process, and may also be set to a fullness with a fluctuating preset value with respect to the preset initial fullness obtained in the initializing process.

Specifically, the formula used to calculate the second fullness of the virtual buffer of the current short period corresponding to VBR is as shown in Formula (9), and the formula used to update the second fullness is shown in Formula (10), $$\text{currVBF}_{VBR} = \text{currVBF}_{VBR} + (\text{recent\_bs\_lens} - \text{max\_frame\_size}) \quad (9)$$

$$\text{currVBF}_{VBR} = \text{MAX}(\text{currVBF}_{VBR}, \text{targetVBF}_{VBR}) \quad (10)$$

wherein, $\text{currVBF}_{VBR}$ the second fullness of the virtual buffer of the current short period corresponding to the VBR, recent_bs_lens is the bit stream length in the first bit stream information, max_frame_size is the second target bit average of the video frame in the current short period, and $\text{targetVBF}_{VBR}$ is the second target fullness of the virtual butler of the current short period corresponding to the VBR.

Third, obtaining a second target bit of the current video frame in the current short period by calculation according to the second fullness, the second target fullness, the second target bit average, and the preset adjustment intensity parameter.

Specifically, the formula used to calculate the second target bit of the current video frame in the current short period is as shown in Formula (11).

$$\text{Target\_bytes}_{VBR} = \left(1 + K_p \cdot \frac{\text{targetVBF}_{VBR} - \text{currVBF}_{VBR}}{\text{targetVBF}_{VBR}}\right) \cdot \text{max\_frame\_size} \quad (11)$$

wherein, $\text{Target\_bytes}_{VBR}$ is the second target bit of the current video frame in the current short period, $K_p$ is the preset adjustment intensity parameter, $\text{Target\_bytes}_{VBR}$ is the second target fullness of the virtual buffer of the current short period corresponding to the VBR, $\text{currVBF}_{VBR}$ is the second fullness of the virtual buffer of the current short period corresponding to the VBR, max_frame_size is the second target bit average of the video frame in the current short period; the preset adjustment intensity parameter is a parameter for controlling the adjustment intensity of the target bit of the current video frame in the current short period, and may be set to any value between 0 to 1.0.

It should be emphasized that the second target bit has the following relationship with the minimum value of the second target bit and the maximum value of the second target bit: $\text{Target\_bytes}_{VBR} = \text{CLIP3}(\text{Target\_bytes}_{VBR}, \text{MIN\_Target\_bytes}_{VBR}, \text{MAX\_Target\_bytes}_{VBR})$ wherein, the function of $\text{CLIP3}(\text{Target\_bytes}_{VBR}, \text{MIN\_Target\_bytes}_{VBR}, \text{MAX\_Target\_bytes}_{VBR})$ represents that $\text{Target\_bytes}_{VBR}$ is itself when the first target bit $\text{Target\_bytes}_{VBR}$ is greater than the minimum value of the first target bit $\text{MIN\_Target\_bytes}_{VBR}$ and less than the maximum value of the first target bit $\text{MAX\_Target\_bytes}_{VBR}$; when $\text{Target\_bytes}_{VBR}$ is less than $\text{MIN\_Target\_bytes}_{VBR}$; $\text{MIN\_Target\_bytes}_{VBR}$ is assigned to $\text{Target\_bytes}_{VBR}$; when $\text{Target\_bytes}_{VBR}$ is greater than $\text{MAX\_Target\_bytes}_{VBR}$, $\text{MAX\_Target\_bytes}_{VBR}$ is assigned to $\text{Target\_bytes}_{VBR}$.

Finally, determining the second frame-level coding parameter of the current short period corresponding to the VBR by calculation according to the coding quality information in the first bit stream information, the bit stream length in the first bit stream information, the second target bit, and the second target bit average, and using the second frame-level coding parameter as the frame-level coding parameter of the current short period.

Specifically, the formula used to calculate the second frame-level coding parameter of the current short period corresponding to the VBR is as shown in Formula (12).

$$QP_{VBR} = \text{prev\_qp} + \frac{K_{bytes\_to\_qp} \cdot (\text{recent\_bs\_lens} - \text{Target\_bytes}_{VBR})}{\text{max\_frame\_size}} \quad (12)$$

wherein, $QP_{VBR}$ is the second frame-level coding parameter of the current short period corresponding to the VBR, prev_qp is a value of a quantization parameter of the coding quality $K_{bytes\_to\_qp}$ is a preset conversion parameter, recent_bs_lens is the bit stream length in the second bit stream information, $\text{Target\_bytes}_{VBR}$ is the second target bit of the video frame in the current short period, max_frame_size is the second target bit average of the video frame in the current short period; the value of the quantization parameter of the coding quality may be the value of the coding QP used by the coded bit stream length of the previous, adjacent video frame; the preset conversion parameter indicates the conversion relationship between the coding bits and the QP value; it should be emphasized that the preset conversion parameter is related to the types of the video frame, and the types of the video frame include a P frame, an I frame, and a B frame; the preset conversion parameter of the I frame is the largest and the preset conversion parameter of the B frame is the smallest.

It should be noted that, for the CBR, the preset average bit rate is used and the target value of the bit rate is defined; for the VBR, the preset upper limit of the bit rate is used and the maximum value of the bit rate is defined. Virtual buffers are respectively established for the bit rate control of short period CBR and the bit rate control of the short period VBR. The advantages of CBR and VBR can be combined together to ensure the stability of image quality while using the storage space to a full extent.

Optionally, in a specific implementation, obtaining a period length of the current short period, the preset bit rate control parameters and the statistical information, and determining an average bit rate of a next short period adjacent to the current short period in the long period according to the period length of the current short period, the preset bit rate control parameters and the statistical information may include:

first, obtaining the expected output bit rate of the virtual buffer of the long period, and determining the expected output bit rate of the virtual buffer of the long period as an expected output bit rate of the current short period.

Second, obtaining the period length of the current short period and the expected output bit rate of the current short period, and obtaining expected output bits of the current short period by calculation according to the period length of the current short period and the expected output bit rate of the current short period.

Specifically, the formula used to calculate the expected output bits of the current short period is as shown in Formula (13), $$Sdst_t = target\_bitrate \cdot T2 \qquad (23)$$

wherein, $Sdst_t$ is the expected output bits of the current short period, target_bitrate is the expected output bit rate of the current short period, T2 is the period length of the current short period.

Third, obtaining an actual fullness of the virtual buffer of the long period, and updating the actual fullness of the virtual buffer of the long period by calculation according to the expected output bits of the current short period, the number of the encoded bits in the current short period, and the actual fullness of the virtual buffer of the long period.

Specifically, the formula used to calculate the actual fullness of the virtual buffer of the long period is as shown in Formula (14).

$$currVBF = currVBF + (Scur_t - Sdst_t) \qquad (14)$$

wherein, currVBF is the actual fullness of the virtual buffer of the long period, $Scur_t$ is the number of the encoded bits in the current short period, $Sdst_t$ is the expected output bits of the current short period.

Fourth, calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period.

Specifically, calculating a target fullness of the virtual buffer of the long period may include:

determining whether the actual fullness of the virtual buffer of the long period is between the target balance upper limit of the virtual buffer of the long period and the target balance lower limit of the virtual buffer of the long period;

if yes, determining the initial fullness as the target fullness of the virtual buffer of the long period;

if not, when the actual fullness of the virtual buffer of the long period is greater than the target balance upper limit of the virtual buffer of the long period, determining the target balance upper limit of the virtual buffer of the long period as the target fullness of the virtual buffer of the long period; when the actual fullness of the virtual buffer of the long period is less than the target balance lower limit of the virtual buffer of the long period, determining the target balance lower limit of the virtual buffer of the long period as the target fullness of the virtual buffer of the long period.

Fifth, calculating a weighted factor of a complexity target bit according to the actual fullness of the virtual buffer of the long period, the preset initial fullness, the target balance upper limit of the virtual buffer of the long period, and the target balance lower limit of the virtual buffer of the long period.

Specifically, calculating a weighted factor of a complexity target bit may include:

determining whether the actual fullness of the virtual buffer of the long period is between the target balance upper limit of the virtual buffer of the long period and the target balance lower limit of the virtual buffer of the long period;

if yes, setting the weighted factor of a complexity target bit as a preset first value, wherein the first value is any value between 0-1;

if not, setting the weighted factor of a complexity target bit as a preset second value, wherein the second value is any value between 0-1 other than the preset first value.

Figure 6:
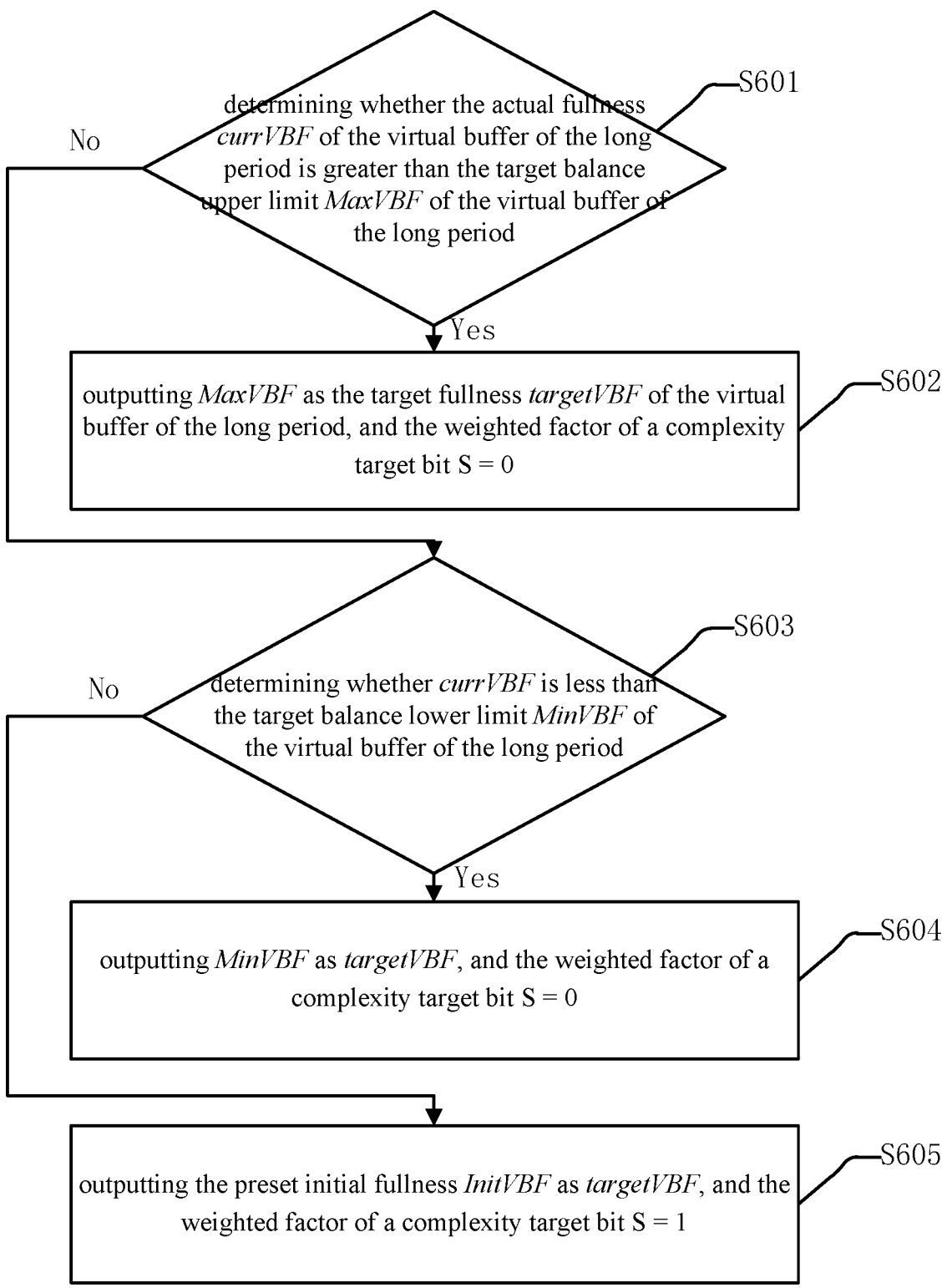
FIG. 6 is a schematic flowchart of a step of determining a target fullness and a weighted factor according to an embodiment of the present application.

Optionally, as shown in FIG. 6, in a specific implementation, determining the target fullness of the virtual buffer of the long period and the weighted factor of a complexity target bit may include:

S601, determining whether the actual fullness currVBF of the virtual buffer of the long period is greater than the target balance upper limit MaxVBF of the virtual buffer of the long period, if yes, executing S602, otherwise executing S603;

S602, outputting MaxVBF as the target fullness targetVBF of the virtual buffer of the long period, and the weighted factor of a complexity target bit S=0;

S603, determining whether currVBF is less than the target balance lower limit MinVBF of the virtual buffer of the long period, if yes, executing S604, otherwise executing S605;

S604, outputting MinVBF as targetVBF, and the weighted factor of a complexity target bit S=0;

S605, outputting the preset initial fullness InitVBF as targetVBF, and the weighted factor of a complexity target bit S=1.

It should be noted that the closer the actual fullness of the virtual buffer of the long period is to the upper limit of the target equilibrium point of the virtual buffer of the long period or the lower limit of the target equilibrium point of the virtual buffer of the long period, the smaller the weighted factor of a complexity target bit is, and the weighted factor of target bit of the virtual buffer is greater, the target fullness of the virtual buffer of the long period increases.

Sixth, obtaining a target bit rate of the virtual buffer of the next short period in the long period by calculation according to the target fullness of the virtual buffer of the long period, the actual fullness of the virtual buffer of the long period, a preset adjustment intensity parameter, and a preset adjustment reference bit rate.

Specifically, the formula used to calculate the target bit rate of the virtual buffer of the next, adjacent short period in the long period is as shown in Formula (15), $$\text{Target\_VBP}_{t+1} = \left(1 + K_P \cdot \frac{targetVBF - currVBF}{targetVBF}\right) \cdot \text{Target\_bitrate} \qquad (15)$$

wherein, Target_VBF$_{t+1}$ the target bit rate of the virtual buffer of the next, adjacent short period in the long period, $K_p$ is the preset adjustment intensity parameter, targetVBF is the target fullness of the virtual buffer of the long period, currVBF is the actual fullness of the virtual buffer of the long period, Target_bitrate is the preset adjustment reference bit rate.

Seventh, determining a complexity target bit rate of the next short period in the long period according to the complexity information of the current video frame, the preset image quality level, the number of the encoded bits in the current short period, and the period length of the current short period.

Specifically, the formula used to calculate the complexity target bit rate of the next, adjacent short period in the long period is as shown in Formula (16), $$\begin{cases} \text{fg\_bytes}_t = \dfrac{\text{fg\_num}_t \cdot \text{qp\_scale}[\text{fg\_qp}]}{\text{fg\_num}_t \cdot \text{qp\_scale}[\text{fg\_qp}] + \text{bg\_num}_t \cdot \text{qp\_scale}[\text{bg\_qp}]} \cdot Scur_t \\ \text{bg\_bytes}_t = Scur_t - \text{fg\_bytes}_t \\ \text{fg\_bytes}_{t+1} = \text{fg\_bytes}_t \cdot \dfrac{\text{fg\_num}_{t+1}}{\text{fg\_num}_t} \\ \text{bg\_bytes}_{t+1} = \text{bg\_bytes}_t \cdot \dfrac{\text{bg\_num}_{t+1}}{\text{bg\_num}_t} \\ \text{Target\_CPLX}_{t+1} = \dfrac{\text{fg\_bytes}_{t+1} + \text{bg\_bytes}_{t+1}}{T2} \end{cases} \quad (16)$$

wherein, $\text{fg\_bytes}_t$ is overall foreground bits of the current short period in the long period, $\text{fg\_num}_t$ is overall foreground points of the current short period in the long period, $\text{qp\_scale}[\text{fg\_qp}]$ is a relative correlation between the foreground QP value and the coding size, $\text{bg\_num}_t$ is overall background points of the current short period in the long period, $\text{qp\_scale}[\text{bg\_qp}]$ is a relative correlation between the background QP value and the coding size, $Scur_t$ is the number of the encoded bits in the current short period, $\text{bg\_bytes}_t$ is overall background bits of the current short period in the long period, $\text{fg\_bytes}_{t+1}$ is overall foreground bits of the next, adjacent short period in the long period, $\text{fg\_num}_{t+1}$ is overall foreground points of the next, adjacent short period in the long period, $\text{fg\_num}_{t+1}$ is obtained by estimation through $\text{fg\_num}_{t+1} = 2 \cdot \text{fg\_num}_t - \text{fg\_num}_{t-1}$, $\text{fg\_num}_{t-1}$ is overall foreground bits of the previous, adjacent short period in the long period, $\text{bg\_bytes}_{t+1}$ is overall background bits of the next, adjacent short period in the long period, $\text{bg\_num}_{t+1}$ is overall background points of the next, adjacent short period in the long period, $\text{Target\_CPLX}_{t+1}$ is the complexity target bit rate of the next, adjacent short period in the long period, T2 is the period length of the current short period.

It should be noted that the relationship between $\text{qp\_scale}[\text{bg\_qp}]$ and the background QP value, as well as the relationship between $\text{qp\_scale}[\text{fg\_qp}]$ and the foreground QP value are nonlinear inverse relationships.

Finally, determining an average bit rate of the next short period in the long period by weighted calculation according to the target bit rate of the virtual buffer of the next short period in the long period, the complexity target bit rate of the next short period in the long period, and the weighted factor of a complexity target bit.

Specifically, the formula used to calculate the average bit rate of the next, adjacent short period in the long period is as shown in Formula (17), $$\text{Target}_{t+1} = s \cdot \text{Target\_CPLX}_{t+1} + (1-s) \cdot \text{Target\_VBF}_{t+1} \quad (17)$$

wherein, $\text{Target}_{t+1}$ is the average bit rate of the next, adjacent short period in the long period, s is the weighted factor of a complexity target bit, $\text{Target\_CPLX}_{t+1}$ is the complexity target bit rate of the next, adjacent short period in the long period, $\text{Target\_VBF}_{t+1}$ is the target bit rate of a virtual buffer of the next, adjacent short period in the long period.

Applying the embodiment, by setting the bit rate control parameters, not only the storage space is calculated accurately, but also the bandwidth limitation is coped with, the error between the actual encoded average bit rate and the set average bit rate is accurately controlled by quantization of index, the configured storage space is utilized to a full extent, a stable image quality is ensured by the complexity information, and a stable image quality is realized during both idle period and busy period by a bit rate control method with the combination of a long period and a short period, thereby storage space is reasonably allocated under the condition that the image satisfies a certain quality. In addition, a virtual buffer for controlling the long period is established by determining initialization parameters by initialization, which satisfy a certain condition and include the target balance upper limit of the virtual buffer of the long period, the target balance lower limit of the virtual buffer of the long period, and the expected output bit rate of the virtual buffer of the long period, thereby ensuring the space of the virtual buffer can be used to a full extent when controlling the short periods.

Figure 7:
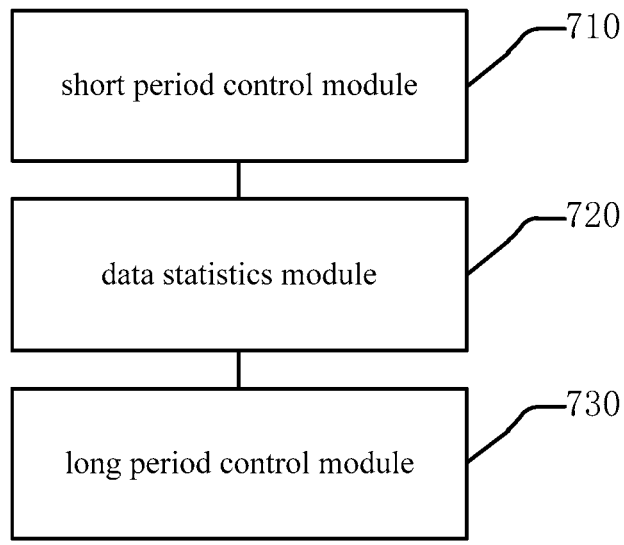
FIG. 7 is a schematic structural diagram of a bit rate control apparatus according to an embodiment of the present application; Figure

Corresponding to the foregoing embodiment of the bit rate control method, as shown in FIG. 7, an embodiment of the present application provides a bit rate control apparatus, including:

a short period control module 710, configured for obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period, the preset bit rate control parameters include a preset upper limit of the bit rate, a preset image quality level, a preset average bit rate, a control error of the preset average bit rate, and a preset frame rate, the bit stream information includes coding quality information and length information of bit stream; obtaining second bit stream information sent by the encoder, wherein the second bit stream information is information of a bit stream encoded through encoding the current video frame by the encoder according to the frame-level coding parameter of the current short period;

a data statistics module 720, configured for obtaining, according to the second bit stream information, statistical information comprising complexity information of the current video frame, the number of the encoded bits of the current short period, and coding quality information of the current short period;

a long period control module 730, configured for determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

Applying the embodiment, by setting the bit rate control parameters, not only the storage space is calculated accurately but also the bandwidth limitation is coped with, the error between the actual encoded average bit rate and the set average bit rate is accurately controlled by quantization of index, the configured storage space is utilized to a full extent, a stable image quality is ensured by the complexity information, and a stable image quality is realized during both idle period and busy period by a bit rate control method with the combination of a long period and a short period, thereby storage space is reasonably allocated under the condition that the image satisfies a certain quality.

Figure 8:
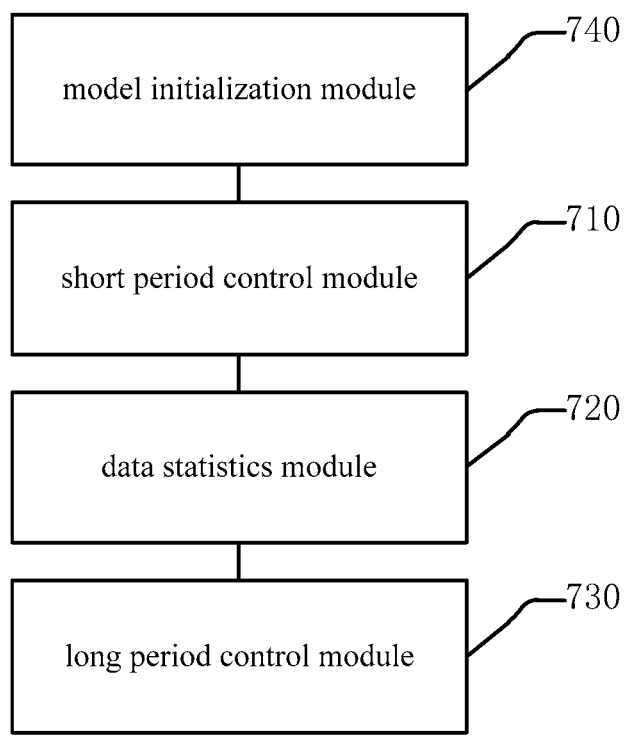
FIG. 8 is another schematic structural diagram of a bit rate control apparatus according to an embodiment of the present application; Figure

Further, on the basis of including a short period control module 710, a data statistics module 720 and a long period control module 730, as shown in FIG. 8, the bit rate control apparatus according to the embodiment may further include:

a model initialization module 740, configured for obtaining preset bit rate control parameters and a preset period length of the long period input by a user; determining a target balance upper limit of the virtual buffer of the long period, a target balance lower limit of the virtual buffer of the long period, and an expected output bit rate of the virtual buffer of the long period according to the control error of the preset average bit rate, the preset average bit rate, the preset period length of the long period, a preset initial fullness, and a preset condition, wherein the preset condition is:

$$\begin{cases} 0 \le \text{ERROR\_RANGE} \le 1 \\ \text{Min}VBF \le \text{Init}VBF \le \text{Max}VBF \\ \text{Max}VBF - \text{Min}VBF \le \text{ERROR\_RANGE }\% \cdot \text{TARGET\_BITRATE} \cdot T \\ (1 - \text{ERROR\_RANGE}) \cdot \text{TARGET\_BITRATE} \le \\ \quad \text{target\_bitrate} \le \text{TARGET\_BITRATE} \end{cases}$$

ERROR_RANGE is the control error of the preset average bit rate, MinVBF is the target balance lower limit of the virtual buffer of the long period, InitVBF is the preset initial fullness, MaxVBF is the target balance upper limit of the virtual buffer of the long period, TARGET_BITRATE is the preset average bit rate, T is the preset period length of the long period, target_bitrate is the expected output bit rate of the virtual buffer of the long period.

Specifically, the model initialization module 740 uses Formula (18) to determine the target balance upper limit of the virtual buffer of the long period, the target balance lower limit of the virtual buffer of the long period, and the expected output bit rate of the virtual buffer of the long period, $$\begin{cases} \text{Init}VBF = 0 \\ \text{Max}VBF = \text{Init}VBF + \dfrac{\text{ERROR\_RANGE }\%}{2} \cdot \\ \qquad \text{TARGET\_BITRATE} \cdot T \\ \text{Min}VBF = \text{Init}VBF - \dfrac{\text{ERROR\_RANGE }\%}{2} \cdot \\ \qquad \text{TARGET\_BITRATE} \cdot T \\ \text{target\_bitrate} = \left(1 - \dfrac{\text{ERROR\_RANGE }\%}{2}\right) \cdot \\ \qquad \text{TARGET\_BITRATE} \end{cases} \quad (18)$$

wherein, InitVBF is the preset initial fullness, MaxVBF is the target balance upper limit of the virtual buffer of the long period, ERROR_RANGE is the control error of the preset average bit rate, TARGET_BITRATE is the preset average bit rate, T is the preset period length of the long period, MinVBF is the target balance lower limit of the virtual buffer of the long period, target_bitrate is the expected output bit rate of the virtual buffer of the long period.

Applying the embodiment, by setting the bit rate control parameters, not only the storage space is calculated accurately, but also the bandwidth limitation is coped with, the error between the actual encoded average bit rate and the set average bit rate is accurately controlled by quantization of index, the configured storage space is utilized to a full extent, a stable image quality is ensured by the complexity information, and a stable image quality is realized during both idle period and busy period by a bit rate control method with the combination of a long period and a short period, thereby storage space is reasonably allocated under the condition that the image satisfies a certain quality. In addition, a virtual buffer for controlling the long period is established by determining initialization parameters by initialization, which satisfy a certain condition and include the target balance upper limit of the virtual buffer of the long period, the target balance lower limit of the virtual buffer of the long period, and the expected output bit rate of the virtual buffer of the long period, thereby ensuring the space of the virtual buffer can be used to a full extent when controlling the short periods.

Figure 9:
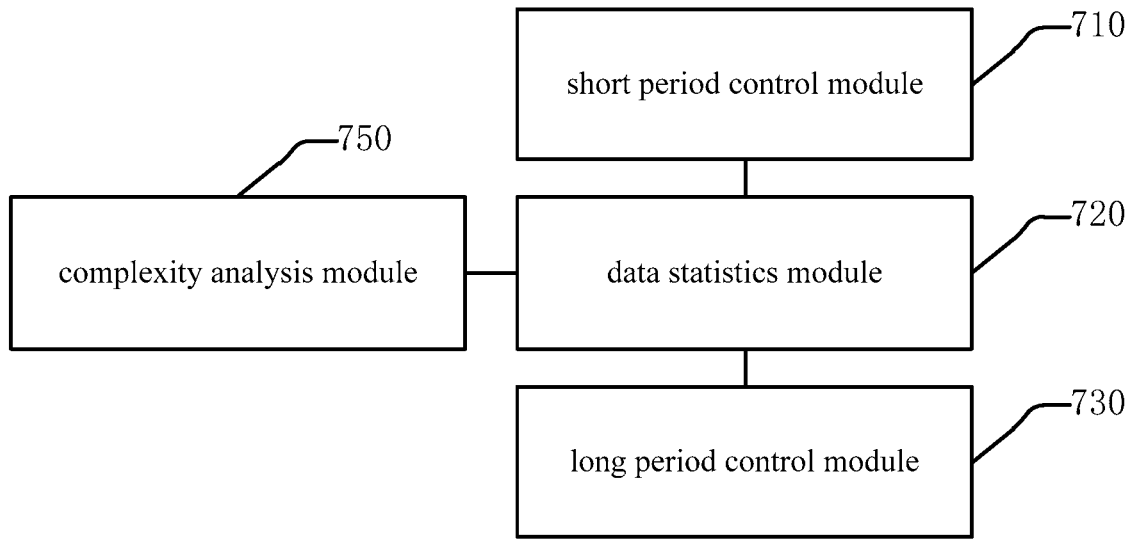
FIG. 9 is still another schematic structural diagram of a bit rate control apparatus according to an embodiment of the present application.

Further, on the basis of including a short period control module 710, a data statistics module 720 and a long period control module 730, as shown in FIG. 9, the bit rate control apparatus provided by the embodiment may further include:

a complexity analysis module 750, configured for performing complexity analysis on the current video frame to obtain complexity information of the current video frame.

It should be noted that the method of complexity analysis adopted by the complexity analysis module 750 may be to perform motion detection on the input video frame, or to perform texture complexity analysis on the input video frame, or to analyze the size of the encoded bit stream, image quality, which are all reasonable. The complexity of a video frame can be expressed by the motion complexity or by the texture complexity; the complexity information can be represented by the motion area or the residual SAD (Sum of Absolute Difference), which is all reasonable.

Applying the embodiment, by setting the bit rate control parameters, not only the storage space is calculated accurately but also the bandwidth limitation is coped with, the error between the actual encoded average bit rate and the set average bit rate is accurately controlled by quantization of index, the configured storage space is utilized to a full extent, a stable image quality is ensured by the complexity information, and a stable image quality is realized during both idle period and busy period by a bit rate control method with the combination of a long period and a short period, thereby storage space is reasonably allocated under the condition that the image satisfies a certain quality; in addition, the quality degradation caused by the fluctuation of complexity is addressed by the complexity information.

Figure 10:
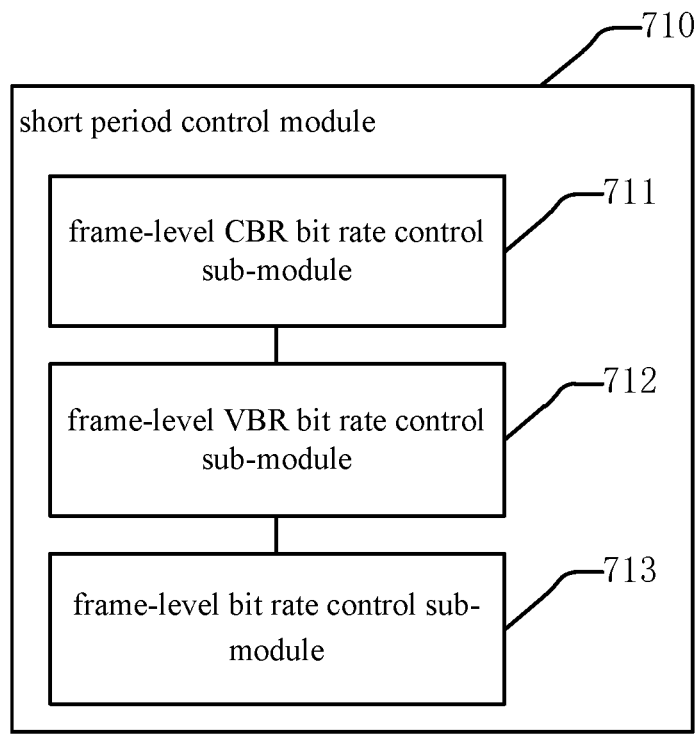
FIG. 10 is a schematic structural diagram of a short period control module according to an embodiment of the present application.

As shown in FIG. 10, optionally, the coding control parameters further include an average bit rate of the current short period;

in the embodiment, the short period control module 710 may include:

a frame-level CBR bit rate control sub-module 711, configured for, when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period.

Specifically, the frame-level CBR bit rate control sub-module 711 may include:

a first calculating unit, configured for obtaining the average bit rate of the current short period and the preset frame rate in the preset bit rate control parameters, and obtaining a first target bit average of video frames in the current short period by calculation according to the average bit rate of the current short period and the preset frame rate in the preset bit rate control parameters;

a second calculating unit, configured for obtaining a bit stream length in the first bit stream information and a first fullness of the virtual buffer of the current short period corresponding to the CBR, and updating the first fullness by calculation according to the bit stream length in the first bit stream information, the first fullness and the first target bit average;

a third calculating unit, configured for obtaining a first target fullness of the virtual buffer of the current short period corresponding to the CBR, and obtaining a first target bit of the current video frame in the current short period by calculation according to the first fullness, the first target fullness, the first target bit average and a preset adjustment intensity parameter;

a fourth calculating unit, configured for determining a first frame-level coding parameter of the current short period corresponding to the CBR by calculation according to the coding quality information in the first bit stream information, the bit stream length in the first bit stream information, the first target bit and the first target bit average.

Wherein, the first calculating unit uses Formula (19) to calculate the first target bit average of the video frame in the current short period, $$\text{avg\_frame\_size} = \frac{Target_t}{\text{frame\_rate}} \quad (19)$$

wherein, avg_frame_size is the first target bit average of the video frame in the current short period, $Target_t$ is the average bit rate of the current short period, frame_rate is the preset frame rate.

It should be noted that the first calculating unit may further use Formula (20) to calculate the minimum value of the first target bit and the maximum value of the first target bit of the video frame, $$\begin{cases} \text{MIN\_Target\_bytes}_{CBR} = \dfrac{\text{avg\_frame\_size}}{4} \\ \text{MAX\_Target\_bytes}_{CBR} = 2 \cdot \text{avg\_frame\_size} \end{cases} \quad (20)$$

wherein, $\text{MIN\_Target\_bytes}_{CBR}$ is the minimum value of the first target bit of the video frame, avg_frame_size is the first target bit average of the video frame in the current short period, $\text{MAX\_Target\_bytes}_{CBR}$ is the maximum value of the first target bit of the video frame;

the second calculating unit uses Formula (21) to calculate the first fullness of the virtual buffer of the current short period corresponding to the CBR, $$\text{currVBF}_{CBR} = \text{currVBF}_{CBR} + (\text{recent\_bs\_lens} - \text{avg\_frame\_size}) \quad (21)$$

wherein, $\text{currVBF}_{CBR}$ is the first fullness of the virtual buffer of the current short period corresponding to the CBR, recent_bs_lens is the bit stream length in the first bit stream information, avg_frame_size is the first target bit average of the video frame in the current short period;

the third calculating unit uses Formula (22) to calculate the first target bit of the current video frame in the current short period, $$\text{Target\_bytes}_{CBR} = \left(1 + K_p \cdot \frac{\text{targetVBF}_{CBR} - \text{currVBF}_{CBR}}{\text{targetVBF}_{CBR}}\right) \cdot \text{avg\_frame\_size} \quad (22)$$

wherein, $\text{Target\_bytes}_{CBR}$ is the first target bit of the current video frame in the current short period, $K_p$ is the preset adjustment intensity parameter, $\text{targetVBF}_{CBR}$ is the first target fullness of the virtual buffer of the current short period corresponding to the CBR, $\text{currVBF}_{CBR}$ is the first fullness of the virtual buffer of the current short period corresponding to the CBR, avg_frame_size is the first target bit average of the video frame in the current short period; the preset adjustment intensity parameter is a parameter for controlling the adjustment intensity of the target bit of the current video frame in the current short period, and may be set to any value between 0 to 1.0;

it should be emphasized that the first target bit has the following relationships with the minimum value of the first target bit and the maximum value of the first target bit: $\text{Target\_bytes}_{CBR} = \text{CLIP3}(\text{Target\_bytes}_{CBR}, \text{MIN\_Target\_bytes}_{CBR}, \text{MAX\_Target\_bytes}_{CBR})$ wherein, the function of $\text{CLIP3}(\text{Target\_bytes}_{CBR}, \text{MIN\_Target\_bytes}_{CBR}, \text{MAX\_Target\_bytes}_{CBR})$ represents that $\text{Target\_bytes}_{CBR}$ is itself when the first target bit $\text{Target\_bytes}_{CBR}$ is greater than the minimum value of the first target bit $\text{MIN\_Target\_bytes}_{CBR}$ and less than the maximum value of the first target bit $\text{MAX\_Target\_bytes}_{CBR}$; when $\text{Target\_bytes}_{CBR}$ is less than $\text{MIN\_Target\_bytes}_{CBR}$; $\text{MIN\_Target\_bytes}_{CBR}$ is assigned to $\text{Target\_bytes}_{CBR}$; when $\text{Target\_bytes}_{CBR}$ is greater than $\text{MAX\_Target\_bytes}_{CBR}$, $\text{MAX\_Target\_bytes}_{CBR}$ is assigned to $\text{Target\_bytes}_{CBR}$.

The fourth calculating unit uses Formula (23) to calculate the first frame-level coding parameter of the current short period corresponding to the CBR as the frame-level coding parameter of the current short period, $$QP_{CBR} = \text{prev\_qp} + \frac{K_{bytes\_to\_qp} \cdot (\text{recent\_bs\_lens} - \text{Target\_bytes}_{CBR})}{\text{avg\_frame\_size}} \quad (23)$$

wherein $QP_{CBR}$ is the first frame-level coding parameter of the current short period corresponding to the CBR, prev_qp is a value of a quantization parameter of the coding quality, $K_{bytes\_to\_qp}$ is a preset conversion parameter, recent_bs_lens is the bit stream length in the first bit stream information, $\text{Target\_bytes}_{CBR}$ is the first target bit of the current video frame in the current short period, avg_frame_size is the first target bit average of the video frame in the current short period; the value of the quantization parameter of the coding quality may be the value of the coding QP used by the coded bit stream length of the previous, adjacent video frame; the preset conversion parameter indicates the conversion relationship between the coding bits and the QP value; it should be emphasized that the preset conversion parameter is related to the types of the video frame, and the types of the video frame include a P frame, an I frame, and a B frame; the preset conversion parameter of the I frame is the largest and the preset conversion parameter of the B frame is the smallest.

A frame-level VBR bit rate control sub-module 712 is configured for, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period.

Specifically, the frame-level VBR bit rate control submodule 712 may include:

a fifth calculating unit, configured for obtaining the preset upper limit of the bit rate and the preset frame rate in the preset bit rate control parameters, and obtaining a second target bit average of video frames in the current short period by calculation according to the preset upper limit of the bit rate and the preset frame rate in the preset bit rate control parameters;

a sixth calculating unit, configured for obtaining a bit stream length in the first bit stream information, a second fullness of the virtual buffer of the current short period corresponding to the VBR, and a second target fullness of the virtual buffer of the current short period corresponding to the VBR, and determining a maximum value in the second fullness after being updated and the second target bit average as the second fullness by calculation according to the bit stream length in the first bit stream information, the second fullness and the second target bit average;

a seventh calculating unit, configured for obtaining a second target bit of the current video frame in the current short period by calculation according to the second fullness, the second target fullness, the second target bit average, and the preset adjustment intensity parameter;

an eighth calculating unit, configured for determining the second frame-level coding parameter of the current short period corresponding to the VBR by calculation according to the coding quality information in the first bit stream information, the bit stream length in the first bit stream information, the second target bit, and the second target bit average.

Wherein, the fifth calculating unit uses Formula (24) to calculate the second target bit average of the video frame in the current short period, $$\text{max\_frame\_size} = \frac{\text{MAX\_BITRATE}}{\text{frame\_rate}} \quad (24)$$

wherein, max_frame_size is the second target bit average of the video frame in the current short period, MAX_BITRATE is the preset upper limit of the bit rate, frame_rate is the preset frame rate.

It should be noted that the fifth calculating unit may further use Formula (25) to calculate the minimum value of the second target bit and the maximum value of the second target bit of the video frame, $$\begin{cases} \text{MIN\_Target\_bytes}_{VBR} = \dfrac{\text{max\_frame\_size}}{4} \\ \text{MAX\_Target\_bytes}_{VBR} = 2 \cdot \text{max\_frame\_size} \end{cases} \quad (25)$$

wherein, MIN_Target_bytes$_{VBR}$ is the minimum value of the second target bit of the video frame, max_frame_size is the second target bit average of the video frame in the current short period, and MAX_BITRATE is the maximum value of the second target bit of the video frame;

the sixth calculating unit uses Formula (26) to calculate the second fullness of the virtual buffer of the current short period corresponding to VBR, $$\text{currVBF}_{VBR} = \text{currVBF}_{VBR} + (\text{recent\_bs\_lens} - \text{max\_frame\_size}) \quad (26)$$

wherein, currVBF$_{VBR}$ is the second fullness of the virtual buffer of the current short period corresponding to the VBR, recent_bs_lens is the bit stream length in the first bit stream information, max_frame_size is the second target bit average of the video frame in the current short period;

the sixth calculating unit uses Formula (27) to update the second fullness of the virtual buffer of the current short period corresponding to VBR, $$\text{currVBF}_{VBR} = \text{MAX}(\text{currVBF}_{VBR}, \text{targetVBF}_{VBR}) \quad (27)$$

wherein, currVBF$_{VBR}$ is the second fullness of the virtual buffer of the current short period corresponding to the VBR, and targetVBF$_{VBR}$ is the second target fullness of the virtual buffer of the current short period corresponding to the VBR;

the seventh calculating unit uses Formula (28) to calculate the second target bit of the current video frame in the current short period, $$\text{Target\_bytes}_{VBR} = \left(1 + K_p \cdot \frac{\text{targetVBF}_{VBR} - \text{currVBF}_{VBR}}{\text{targetVBF}_{VBR}}\right) \cdot \text{max\_frame\_size} \quad (28)$$

wherein, Target_bytes$_{VBR}$ is the second target bit of the current video frame in the current short period, $K_p$ is the preset adjustment intensity parameter, targetVBF$_{VBR}$ the second target fullness of the virtual buffer of the current short period corresponding to the VBR, currVBF$_{VBR}$ is the second fullness of the virtual buffer of the current short period corresponding to the VBR, max_frame_size is the second target bit average of the video frame in the current short period; the preset adjustment intensity parameter is a parameter for controlling the adjustment intensity of the target bit of the current video frame in the current short period, and may be set to any value between 0 to 1.0;

it should be emphasized that the second target bit has the following relationship with the minimum value of the second target bit and the maximum value of the second target bit: Target_bytes$_{VBR}$=CLIP3(Target_bytes$_{VBR}$, MIN_Target_bytes$_{VBR}$, MAX_Target_bytes$_{VBR}$) wherein, the function of CLIP3(Target_bytes$_{VBR}$, MIN_Target_bytes$_{VBR}$, MAX_Target_bytes$_{VBR}$) represents that Target_bytes$_{VBR}$ is itself when the first target bit Target_bytes$_{VBR}$ is greater than the minimum value of the first target bit MIN_Target_bytes$_{VBR}$ and less than the maximum value of the first target bit MAX_Target_bytes$_{VBR}$; when Target_bytes$_{VBR}$ is less than MIN_Target_bytes$_{VBR}$; MIN_Target_bytes$_{VBR}$ is assigned to Target_bytes$_{VBR}$; when Target_bytes$_{VBR}$ is greater than MAX_Target_bytes$_{VBR}$, MAX_Target_bytes$_{VBR}$ is assigned to Target_bytes$_{VBR}$.

The eighth calculating unit uses Formula (29) to calculate the second frame-level coding parameter of the current short period corresponding to the VBR, $$QP_{VBR} = \text{prev\_qp} + \frac{K_{bytes\_to\_qp} \cdot (\text{recent\_bs\_lens} - \text{Target\_bytes}_{VBR})}{\text{max\_frame\_size}} \quad (29)$$

Target_bytes$_{VBR}$ is the second frame-level coding parameter of the current short period corresponding to the VBR, prev_qp is a value of a quantization parameter of the coding quality, K$_{bytes\_to\_qp}$ is a preset conversion parameter, recent_bs_lens is the bit stream length in the second bit stream information, Target_bytes$_{VBR}$ is the second target bit of the video frame in the current short period, max_frame_size is the second target bit average of the video frame in the current short period; the value of the quantization parameter of the coding quality may be the value of the coding QP used by the coded bit stream length of the previous, adjacent video frame; the preset conversion parameter indicates the conversion relationship between the coding bits and the QP value; it should be emphasized that the preset conversion parameter is related to the types of the video frame, and the types of the video frame include a P frame, an I frame, and a B frame; the preset conversion parameter of the I frame is the largest and the preset conversion parameter of the B frame is the smallest.

A frame-level bit rate control sub-module 713 is configured for, when the obtained bit rate control mode of the current short period in the long period includes both of a CBR mode and a VBR mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information; determining a second frame-level coding parameter corresponding to the VBR by calculation according to the preset upper limit of the bit rate, the preset frame rate in the preset bit rate control parameters and the first bit stream information; when the frame-level coding parameter has a positive correlation with the bit stream length, determining a minimum value in the first frame-level coding parameter and the second frame-level coding parameter as the frame-level coding parameter of the current short period; when the frame-level coding parameter has a negative correlation with the bit stream length, determining a maximum value in the first frame-level coding parameter and the second frame-level coding parameter as the frame-level coding parameter of the current short period.

Optionally, the apparatus may be further configured for, when the long period ends, performing bit rate control of the first short period in a next long period.

Optionally, the apparatus may be further configured for, when the current short period has not ended, obtaining the first bit stream information.

Figure 11:
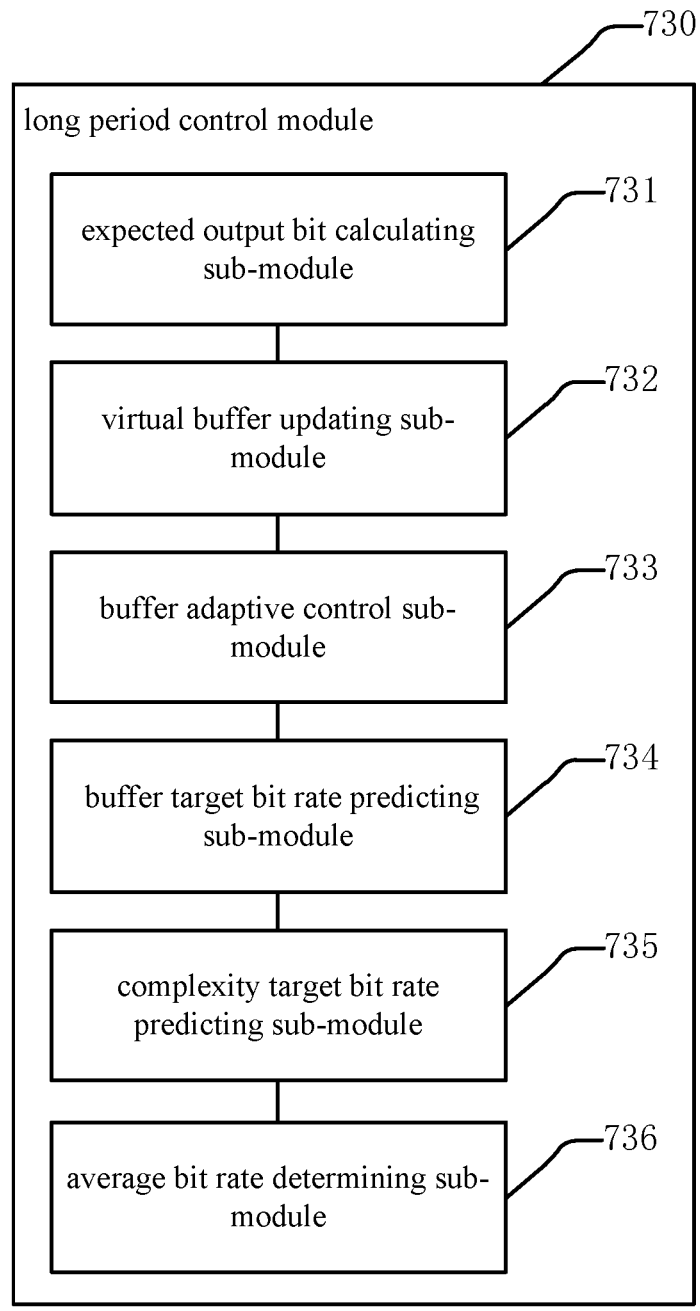
FIG. 11 is a schematic structural diagram of a long period control module according to an embodiment of the present application.
Figure 12:
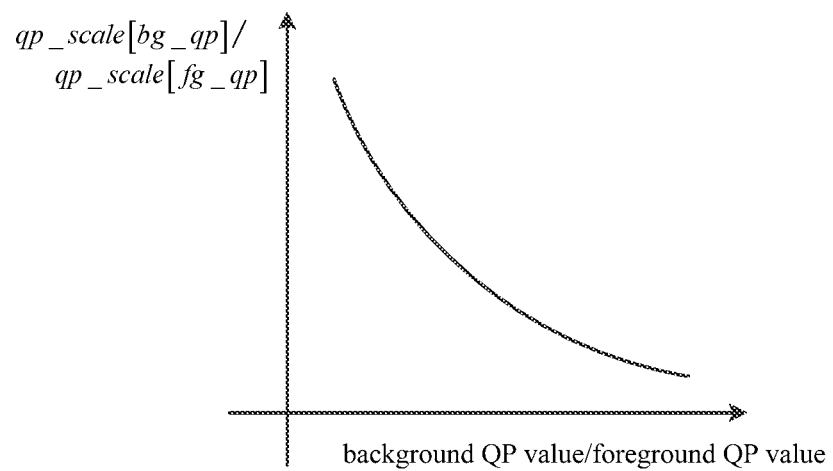
FIG. 12 is a schematic diagram of relationships between qp_scale[bg_qp]/qp_scale[fg_qp] and the background QP value/the foreground QP value according to an embodiment of the present application.

As shown in FIG. 11, optionally, in the embodiment, the long period control module 730 may include:

an expected output bit calculating sub-module 731, configured for obtaining the period length of the current short period and the expected output bit rate of the virtual buffer of the long period, and determining the expected output bit rate of the virtual buffer of the long period as an expected output bit rate of the current short period; obtaining expected output bits of the current short period by calculation according to the period length of the current short period and the expected output bit rate of the current short period;

a virtual buffer updating sub-module 732, configured for obtaining an actual fullness of the virtual buffer of the long period, and updating the actual fullness of the virtual buffer of the long period by calculation according to the expected output bits of the current short period, the number of the encoded bits in the current short period, and the actual fullness of the virtual buffer of the long period.

Specifically, the virtual buffer updating sub-module 732 uses Formula (30) to calculate the actual fullness of the virtual buffer of the long period, $$currVBF = currVBF + (Scur_t - Sdst_t) \qquad (30)$$

wherein, currVBF is the actual fullness of the virtual buffer of the long period, Scur$_t$ is the number of the encoded bits in the current short period, Sdst$_t$ is the expected output bits of the current short period.

A buffer adaptive control sub-module 733 is configured for calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period; and calculating a weighted factor of a complexity target bit according to the actual fullness of the virtual buffer of the long period, the preset initial fullness, the target balance upper limit of the virtual buffer of the long period, and the target balance lower limit of the virtual buffer of the long period.

A buffer target bit rate predicting sub-module 734 is configured for obtaining a target bit rate of the virtual buffer of the next short period in the long period by calculation according to the target fullness of the virtual buffer of the long period, the actual fullness of the virtual buffer of the long period, a preset adjustment intensity parameter, and a preset adjustment reference bit rate.

Specifically, the buffer target bit rate predicting sub-module 734 uses Formula (31) to calculate the target bit rate of the virtual buffer of the next, adjacent short period in the long period, $$\text{Target\_VBF}_{t+1} = \left(1 + K_p \cdot \frac{targetVBF - currVBF}{targetVBF}\right) \cdot \text{Target\_bitrate} \qquad (31)$$

wherein, Target_VBF$_{t+1}$ is the target bit rate of the virtual buffer of the next, adjacent short period in the long period, K$_p$ is the preset adjustment intensity parameter, targetVBF is the target fullness of the virtual buffer of the long period, currVBF is the actual fullness of the virtual buffer of the long period, Target_bitrate is the preset adjustment reference bit rate.

A complexity target bit rate predicting sub-module 735 is configured for determining a complexity target bit rate of the next short period in the long period according to the complexity information of the current video frame, the preset image quality level, the number of the encoded bits in the current short period, and the period length of the current short period.

Specifically, the complexity target bit rate predicting sub-module 735 uses Formula (32) to calculate the complexity target bit rate of the next, adjacent short period in the long period, $$\begin{cases} fg\_bytes_t = \dfrac{fg\_num_t \cdot qp\_scale[fg\_qp]}{fg\_num_t \cdot qp\_scale[fg\_qp] + bg\_num_t \cdot qp\_scale[bg\_qp]} \cdot Scur_t \\ bg\_bytes_t = Scur_t - fg\_bytes_t \\ fg\_bytes_{t+1} = fg\_bytes_t \cdot \dfrac{fg\_num_{t+1}}{fg\_num_t} \\ bg\_bytes_{t+1} = bg\_bytes_t \cdot \dfrac{bg\_num_{t+1}}{bg\_num_t} \\ \text{Target\_CPLX}_{t+1} = \dfrac{fg\_bytes_{t+1} + bg\_bytes_{t+1}}{T2} \end{cases} \qquad (32)$$

wherein, fg_bytes$_t$ is overall foreground bits of the current short period in the long period, fg_num$_t$ is overall foreground points of the current short period in the long period, qp_scale[fg_qp] is a relative correlation between the foreground QP value and the coding size, bg_num$_t$ is overall background points of the current short period in the long period, qp_scale[bg_qp] is a relative correlation between the background QP value and the coding size, Scur$_t$ is the number of the encoded bits in the current short period, bg_bytes$_t$ is overall background bits of the current short period in the long period, fg_bytes$_{t+1}$ is overall foreground bits of the next, adjacent short period in the long period, fg_num$_{t+1}$ is overall foreground points of the next, adjacent short period in the long period, fg_num$_{t+1}$ is obtained by estimation through fg_num$_{t+1}$=2·fg_num$_t$−fg_num$_{t-1}$, fg_num$_{t-1}$ is overall foreground bits of the previous, adjacent short period in the long period, bg_bytes$_{t+1}$ is overall background bits of the next, adjacent short period in the long period, bg_num$_{t+1}$ is overall background points of the next, adjacent short period in the long period. Target_CPLX$_{t+1}$ is the complexity target bit rate of the next, adjacent short period in the long period, T2 is the period length of the current short period An average bit rate determining sub-module 736 is configured for determining an average bit rate of the next short period in the long period by weighted calculation according to the target bit rate of the virtual buffer of the next short period in the long period, the complexity target bit rate of the next short period in the long period, and the weighted factor of a complexity target bit.

Specifically, the average bit rate determining sub-module 736 uses Formula (33) to calculate the average bit rate of the next, adjacent short period in the long period, $$\text{Target}_{t+1}=s\cdot\text{Target\_CPLX}_{t+1}+(1-s)\cdot\text{Target\_VBF}_{t+1} \quad (33)$$

wherein, Target$_{t+1}$ is the average bit rate of the next, adjacent short period in the long period, s is the weighted factor of a complexity target bit, Target_CPLX$_{t+1}$ is the complexity target bit rate of the next, adjacent short period in the long period, Target_VBF$_{t+1}$ is the target bit rate of a virtual buffer of the next, adjacent short period in the long period.

Optionally, the buffer adaptive control sub-module may be specifically further configured for:

determining whether the actual fullness of the virtual buffer of the long period is between the target balance upper limit of the virtual buffer of the long period and the target balance lower limit of the virtual buffer of the long period;

if yes, determining the initial fullness as the target fullness of the virtual buffer of the long period;

if not, when the actual fullness of the virtual buffer of the long period is greater than the target balance upper limit of the virtual buffer of the long period, determining the target balance upper limit of the virtual buffer of the long period as the target fullness of the virtual buffer of the long period;

when the actual fullness of the virtual buffer of the long period is less than the target balance lower limit of the virtual buffer of the long period, determining the target balance lower limit of the virtual buffer of the long period as the target fullness of the virtual buffer of the long period.

Optionally, the buffer adaptive control sub-module may be specifically further configured for:

determining whether the actual fullness of the virtual buffer of the long period is between the target balance upper limit of the virtual buffer of the long period and the target balance lower limit of the virtual buffer of the long period;

if yes, setting the weighted factor of a complexity target bit as a preset first value;

if not, setting the weighted factor of a complexity target bit as a preset second value.

It can be understood that, in another implementation of the embodiment of the present application, the bit rate control apparatus may include a short period control module 710, a data statistics module 720, a long period control module 730, a model initialization module 740, and a complexity analysis module 750 at the same time.

It should be noted that, the bit rate control apparatus of the embodiment of the present application is a device to which the above bit rate control method is applied, and all embodiments of the above bit rate control method are applicable to the device, and the same or similar beneficial effects can be achieved.

In addition, corresponding to the bit rate control method provided by the above embodiments, an embodiment of the present application provides a storage medium for storing executable codes, where the executable codes are used to implement the bit rate control method according to the embodiments of the present application when being executed; specifically, the bit rate control method includes:

obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period;

obtaining second bit stream information sent by the encoder, wherein the second bit stream information is information of a bit stream encoded through encoding the current video frame by the encoder according to the frame-level coding parameter of the current short period;

obtaining, according to the second bit stream information, statistical information comprising complexity information of the current video frame, the number of the encoded bits of the current short period, and coding quality information of the current short period;

determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

In this embodiment, the storage medium stores an application program that executes the bit rate control method provided by the embodiments of the present application when being executed, and thus can not only calculate the storage space accurately, but also cope with the bandwidth limitation by setting the bit rate control parameters, accurately control the error between the actual coding average bit rate and the set average bit rate by quantization of index, utilize the configured storage space to a full extent, ensure a stable image quality by the complexity information, and realize a stable image quality during both idle period and busy period by a bit rate control method with the combination of a long period and a short period, thereby storage space is reasonably allocated under the condition that the image satisfies a certain quality.

In addition, corresponding to the bit rate control method provided by the above embodiments, an embodiment of the present application provides an application program for performing the bit rate control method according to the embodiments of the present application when being executed; specifically, the bit rate control method includes:

obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period;

obtaining second bit stream information sent by the encoder, wherein the second bit stream information is information of a bit stream encoded through encoding the current video frame by the encoder according to the frame-level coding parameter of the current short period;

obtaining, according to the second bit stream information, statistical information comprising complexity information of the current video frame, the number of the encoded bits of the current short period, and coding quality information of the current short period;

determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

In this embodiment, the application program implements the bit rate control method provided by the embodiments of the present application when being executed, and thus can not only calculate the storage space accurately, but also cope with the bandwidth limitation by setting the bit rate control parameters, accurately control the error between the actual coding average bit rate and the set average bit rate by quantization of index, utilize the configured storage space to a full extent, ensure a stable image quality by the complexity information, and realize a stable image quality during both idle period and busy period by a bit rate control method with the combination of a long period and a short period, thereby storage space is reasonably allocated under the condition that the image satisfies a certain quality.

In addition, corresponding to the bit rate control method provided by the above embodiments, an embodiment of the present application provides a bit rate control apparatus, including a bit rate controller, an encoder, a memory, a communication interface, and a bus;

the bit rate controller, the encoder, the memory, and the communication interface are connected by the bus and complete communication with each other;

the memory is configured to store executable program codes;

the bit rate controller is configured to execute a program corresponding to the executable program codes by reading the executable program codes stored in the memory, so as to implement the bit rate control method according to the embodiments of the present application;

the encoder is configured to encode a current video frame according to a frame-level coding parameter of the current short period sent by the bit rate controller so as to obtain second bit stream information and send the second bit stream information to the bit rate controller.

Specifically, the bit rate control method according to the embodiments of the present application includes:

obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period includes a plurality of short periods, the current short period is any one of the plurality of short periods, the coding control parameters at least include preset bit rate control parameters and first bit stream information, the first bit stream information is information of an encoded bit stream of a previous video frame adjacent to a current video frame in the current short period;

obtaining second bit stream information sent by the encoder, wherein the second bit stream information is information of a bit stream encoded through encoding the current video frame by the encoder according to the frame-level coding parameter of the current short period;

obtaining, according to the second bit stream information, statistical information comprising complexity information of the current video frame, the number of the encoded bits of the current short period, and coding quality information of the current short period;

determining whether the current short period has ended when the long period has not ended; if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

In this embodiment, the bit rate controller of the bit rate control apparatus executes the application program corresponding to the executable program codes by reading the executable program codes stored in the memory, the application program implements the bit rate control method provided by the embodiments of the present application when being executed, and thus can not only calculate the storage space accurately, but also cope with the bandwidth limitation by setting the bit rate control parameters, accurately control the error between the actual coding average bit rate and the set average bit rate by quantization of index, utilize the configured storage space to a full extent, ensure a stable image quality by the complexity information, and realize a stable image quality during both idle period and busy period by a bit rate control method with the combination of a long period and a short period, thereby storage space is reasonably allocated under the condition that the image satisfies a certain quality.

For the embodiments of the bit rate control apparatus, the application program, and the storage medium, since the method content involved is basically similar to the foregoing method embodiments, the description is relatively simple, and the relevant parts can be referred to the description of the method embodiment.

It should be noted that, in the present specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

The various embodiments in the present specification are described in a related manner, and the same or similar parts between the various embodiments may be referred to each other, and each embodiment focuses on the differences from the other embodiments. In particular, for the system embodiment, since it is basically similar to the method embodiment, the description is relatively simple, and the relevant parts can be referred to the description of the method embodiment.

The above description is only the preferred embodiment of the present application, and is not intended to limit the protection scope of the present application. Any modifications, equivalent substitutions, improvements, and the like made within the spirit and principles of the present application fall within the protection scope of the present application.

The invention claimed is:

1. A bit rate control method, comprising:
obtaining a bit rate control mode and coding control parameters of a current short period in a long period, determining a frame-level coding parameter of the current short period according to the obtained bit rate control mode and coding control parameters, and transmitting the frame-level coding parameter to an encoder, wherein the long period comprises a plurality of short periods, the current short period is any one of the plurality of short periods, the coding control parameters at least comprise preset bit rate control parameters and first bit stream information, the first bit stream information is information of an encoded bit stream of a previous video frame adjacent to a current video frame in the current short period;
obtaining second bit stream information sent by the encoder, wherein the second bit stream information is information of a bit stream encoded through encoding the current video frame by the encoder according to the frame-level coding parameter of the current short period;
obtaining, according to the second bit stream information, statistical information comprising complexity information of the current video frame, the number of the encoded bits of the current short period, and coding quality information of the current short period;
determining whether the current short period has ended when the long period has not ended;
if yes, obtaining a period length of the current short period, the preset bit rate control parameters and the statistical information, and determining an average bit rate of a next short period adjacent to the current short period in the long period according to the period length of the current short period, the preset bit rate control parameters and the statistical information, so as to encode a video frame of the next short period by calculating a frame-level coding parameter of the next short period.

2. The bit rate control method according to claim 1, wherein, the preset bit rate control parameters comprise a preset upper limit of the bit rate, a preset image quality level, a preset average bit rate, a control error of the preset average bit rate, and a preset frame rate;
the bit stream information comprises coding quality information and length information of bit stream.

3. The bit rate control method according to claim 2, wherein, before obtaining a bit rate control mode and coding control parameters of a current short period in a long period, determining a frame-level coding parameter of the current short period according to the obtained bit rate control mode and coding control parameters, the method further comprises:
obtaining preset bit rate control parameters and a preset period length of the long period input by a user;
determining a target balance upper limit of the virtual buffer of the long period, a target balance lower limit of the virtual buffer of the long period, and an expected output bit rate of the virtual buffer of the long period according to the control error of the preset average bit rate, the preset average bit rate, the preset period length of the long period, a preset initial fullness, and a preset condition, wherein the preset condition is:

$$\begin{cases} 0 \le \text{ERROR\_RANGE} \le 1 \\ \text{Min}VBF \le \text{Init}VBF \le \text{Max}VBF \\ \text{Max}VBF - \text{Min}VBF \le \text{ERROR\_RANGE } \% \cdot \text{TARGET\_BITRATE} \cdot T \\ (1 - \text{ERROR\_RANGE}) \cdot \text{TARGET\_BITRATE} \le \\ \quad \text{target\_bitrate} \le \text{TARGET\_BITRATE} \end{cases}$$

ERROR_RANGE is the control error of the preset average bit rate, MinVBF is the target balance lower limit of the virtual buffer of the long period, InitVBF is the preset initial fullness, MaxVBF is the target balance upper limit of the virtual buffer of the long period, TARGET_BITRATE is the preset average bit rate, T is the preset period length of the long period, target_bitrate is the expected output bit rate of the virtual buffer of the long period.

4. The bit rate control method according to claim 3, wherein, the coding control parameters further an average bit rate of the current short period;
obtaining a bit rate control mode and coding control parameters of a current short period in a long period, determining a frame-level coding parameter of the current short period according to the obtained bit rate control mode and coding control parameters comprises:
when the obtained bit rate control mode of the current short period in the long period is a Constant Bit Rate (CBR) mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information, and determining the first frame-level coding parameter as the frame-level coding parameter of the current short period;

or, when the obtained bit rate control mode of the current short period in the long period is a Variable Bit Rate (VBR) mode, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information, and determining the second frame-level coding parameter as the frame-level coding parameter of the current short period, wherein the VBR is a bit rate control mode of the first short period in the long period;

or, when the obtained bit rate control mode of the current short period in the long period comprises both of a CBR mode and a VBR mode, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information; determining a second frame-level coding parameter corresponding to the VBR by calculation according to the preset upper limit of the bit rate, the preset frame rate in the preset bit rate control parameters and the first bit stream information; when the frame-level coding parameter has a positive correlation with the bit stream length, determining a minimum value in the first frame-level coding parameter and the second frame-level coding parameter as the frame-level coding parameter of the current short period; when the frame-level coding parameter has a negative correlation with the bit stream length, determining a maximum value in the first frame-level coding parameter and the second frame-level coding parameter as the frame-level coding parameter of the current short period.

5. The bit rate control method according to claim 4, wherein, obtaining the average bit rate of the current short period, the preset frame rate in the preset bit rate control parameters and the first bit stream information, determining a first frame-level coding parameter corresponding to the CBR by calculation according to the average bit rate of the current short period, the preset frame rate in the preset bit rate control parameters and the first bit stream information comprises:

obtaining the average bit rate of the current short period and the preset frame rate in the preset bit rate control parameters, and obtaining a first target bit average of video frames in the current short period by calculation according to the average bit rate of the current short period and the preset frame rate in the preset bit rate control parameters;

obtaining a bit stream length in the first bit stream information and a first fullness of the virtual buffer of the current short period corresponding to the CBR, and updating the first fullness by calculation according to the bit stream length in the first bit stream information, the first fullness and the first target bit average;

obtaining a first target fullness of the virtual buffer of the current short period corresponding to the CBR, and obtaining a first target bit of the current video frame in the current short period by calculation according to the first fullness, the first target fullness, the first target bit average and a preset adjustment intensity parameter;

determining a first frame-level coding parameter of the current short period corresponding to the CBR by calculation according to the coding quality information in the first bit stream information, the bit stream length in the first bit stream information, the first target bit and the first target bit average.

6. The bit rate control method according to claim 4, wherein, obtaining the preset upper limit of the bit rate, the preset frame rate in the preset bit rate control parameters and the first bit stream information, determining a second frame-level coding parameter corresponding to the VBR by calculation according to the preset upper limit of the bit rate, the preset frame rate in the preset bit rate control parameters and the first bit stream information comprises:

obtaining the preset upper limit of the bit rate and the preset frame rate in the preset bit rate control parameters, and obtaining a second target bit average of video frames in the current short period by calculation according to the preset upper limit of the bit rate and the preset frame rate in the preset bit rate control parameters;

obtaining a bit stream length in the first bit stream information, a second fullness of the virtual buffer of the current short period corresponding to the VBR, and a second target fullness of the virtual buffer of the current short period corresponding to the VBR, and determining a maximum value in the second fullness after being updated and the second target bit average as the second fullness by calculation according to the bit stream length in the first bit stream information, the second fullness and the second target bit average;

obtaining a second target bit of the current video frame in the current short period by calculation according to the second fullness, the second target fullness, the second target bit average, and the preset adjustment intensity parameter;

determining the second frame-level coding parameter of the current short period corresponding to the VBR by calculation according to the coding quality information in the first bit stream information, the bit stream length in the first bit stream information, the second target bit, and the second target bit average.

7. The bit rate control method according to claim 1, wherein, the method further comprises:

when the long period ends, performing bit rate control of the first short period in a next long period.

8. The bit rate control method according to claim 1, wherein, the method further comprises:

when the current short period has not ended, obtaining the first bit stream information.

9. The bit rate control method according to claim 3, wherein, obtaining a period length of the current short period, the preset bit rate control parameters and the statistical information, and determining an average bit rate of a next short period adjacent to the current short period in the long period according to the period length of the current short period, the preset bit rate control parameters and the statistical information comprises:

obtaining the expected output bit rate of the virtual buffer of the long period, and determining the expected output bit rate of the virtual buffer of the long period as an expected output bit rate of the current short period;

obtaining the period length of the current short period and the expected output bit rate of the current short period, and obtaining expected output bits of the current short period by calculation according to the period length of the current short period and the expected output bit rate of the current short period;

obtaining an actual fullness of the virtual buffer of the long period, and updating the actual fullness of the virtual buffer of the long period by calculation according to the expected output bits of the current short period, the number of the encoded bits in the current short period, and the actual fullness of the virtual buffer of the long period;

calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period;

calculating a weighted factor of a complexity target bit according to the actual fullness of the virtual buffer of the long period, the preset initial fullness, the target balance upper limit of the virtual buffer of the long period, and the target balance lower limit of the virtual buffer of the long period;

obtaining a target bit rate of the virtual buffer of the next short period in the long period by calculation according to the target fullness of the virtual buffer of the long period, the actual fullness of the virtual buffer of the long period, a preset adjustment intensity parameter, and a preset adjustment reference bit rate;

determining a complexity target bit rate of the next short period in the long period according to the complexity information of the current video frame, the preset image quality level, the number of the encoded bits in the current short period, and the period length of the current short period;

determining an average bit rate of the next short period in the long period by weighted calculation according to the target bit rate of the virtual buffer of the next short period in the long period, the complexity target bit rate of the next short period in the long period, and the weighted factor of a complexity target bit.

10. The bit rate control method according to claim 9, wherein, calculating a target fullness of the virtual buffer of the long period according to the actual fullness of the virtual buffer of the long period, the preset initial fullness, the target balance upper limit of the virtual buffer of the long period, and the target balance lower limit of the virtual buffer of the long period comprises:

determining whether the actual fullness of the virtual buffer of the long period is between the target balance upper limit of the virtual buffer of the long period and the target balance lower limit of the virtual buffer of the long period;

if yes, determining the initial fullness as the target fullness of the virtual buffer of the long period;

if not, when the actual fullness of the virtual buffer of the long period is greater than the target balance upper limit of the virtual buffer of the long period, determining the target balance upper limit of the virtual buffer of the long period as the target fullness of the virtual buffer of the long period; when the actual fullness of the virtual buffer of the long period is less than the target balance lower limit of the virtual buffer of the long period, determining the target balance lower limit of the virtual buffer of the long period as the target fullness of the virtual buffer of the long period.

11. The bit rate control method according to claim 9, wherein, calculating a weighted factor of a complexity target bit according to the actual fullness of the virtual buffer of the long period, the preset initial fullness, the target balance upper limit of the virtual buffer of the long period, and the target balance lower limit of the virtual buffer of the long period comprises:

determining whether the actual fullness of the virtual buffer of the long period is between the target balance upper limit of the virtual buffer of the long period and the target balance lower limit of the virtual buffer of the long period;

if yes, setting the weighted factor of a complexity target bit as a preset first value;

if not, setting the weighted factor of a complexity target bit as a preset second value.

12. A non-transitory computer readable storage medium, which is configured to store executable codes, wherein the executable codes are used to implement the bit rate control method according to claim 1 when executed.

13. A bit rate control device, comprising: a bit rate controller, an encoder, a memory, a communication interface, and a bus;

the bit rate controller, the encoder, the memory, and the communication interface are connected and communicate with each other via the bus;

the memory is configured to store executable program codes;

the bit rate controller is configured to execute a program corresponding to the executable program codes by reading the executable program codes stored in the memory, so as to implement the bit rate control method according to claim 1;

the encoder is configured to encode a current video frame according to a frame-level coding parameter of the current short period sent by the bit rate controller so as to obtain second bit stream information and send the second bit stream information to the bit rate controller.

* * * * *

UNITED STATES PATENT AND TRADEMARK OFFICE
CERTIFICATE OF CORRECTION

Page 1 of 1

PATENT NO. : 10,735,740 B2
APPLICATION NO. : 16/472101
DATED : August 4, 2020
INVENTOR(S) : Lulu Zhou, Jianhua Chen and Xiaoyang Wu It is certified that error appears in the above-identified patent and that said Letters Patent is hereby corrected as shown below:

In the Claims

Column 40, Claim 4, Line 48, insert --comprises-- between "further" and "an".

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*